(12) United States Patent
Imai et al.

(10) Patent No.: US 9,682,323 B2
(45) Date of Patent: Jun. 20, 2017

(54) INFORMATION PROCESSING APPARATUS AND INFORMATION PROCESSING SYSTEM FOR PERMITTING A FIRST USER TO ACCESS GAME SOFTWARE OF A SECOND USER OVER A NETWORK

(71) Applicant: Sony Computer Entertainment Inc., Tokyo (JP)

(72) Inventors: Kenichi Imai, Tokyo (JP); Shigeru Enomoto, Kanagawa (JP); Hiroshi Saito, Tokyo (JP); Toshimasa Aoki, Kanagawa (JP); Satoshi Hashimoto, Tokyo (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 201 days.

(21) Appl. No.: 14/371,297

(22) PCT Filed: Dec. 27, 2012

(86) PCT No.: PCT/JP2012/008349
§ 371 (c)(1),
(2) Date: Jul. 9, 2014

(87) PCT Pub. No.: WO2013/111246
PCT Pub. Date: Aug. 1, 2013

(65) Prior Publication Data
US 2015/0231505 A1  Aug. 20, 2015

Related U.S. Application Data

(60) Provisional application No. 61/589,897, filed on Jan. 24, 2012.

(51) Int. Cl.
A63F 9/24 (2006.01)
A63F 13/71 (2014.01)
(Continued)

(52) U.S. Cl.
CPC .............. *A63F 13/71* (2014.09); *A63F 13/61* (2014.09); *A63F 13/86* (2014.09); *A63F 13/323* (2014.09);
(Continued)

(58) Field of Classification Search
CPC .......... A63F 13/10; A63F 13/12; A63F 13/87; A63F 13/323; A63F 13/35; A63F 13/48;
(Continued)

(56) References Cited

U.S. PATENT DOCUMENTS 7,028,295 B2   4/2006   Li
7,089,554 B2   8/2006   Shiomi
(Continued)

FOREIGN PATENT DOCUMENTS

CN   101378402 A   3/2009
CN   101587495 A   11/2009
(Continued)

OTHER PUBLICATIONS

Steam Support Forum, "Am I allowed to install steam games on multiple clients?", Sep. 3, 2010, <http://forums.steampowered.com/forums/showthread.php?t=1423580>.*
(Continued)

*Primary Examiner* — Justin Myhr
(74) *Attorney, Agent, or Firm* — Matthew B. Dernier, Esq.

(57) ABSTRACT

An acquisition unit acquires image data in which game play is recorded or image data of a game currently being played. A display processing unit displays an image of game play using the acquired image data and displays an image for acquiring game software while the image of the game play is being displayed or after the completion of the display of the image of the game play. When a reception unit receives an input operation in the image for acquiring the game (Continued)

software, a request generation unit generates a request for downloading that indicates, as a destination of the game software, another information processing apparatus different from the information processing apparatus, and a transmission unit transmits the generated request for downloading.

7 Claims, 23 Drawing Sheets

(51) Int. Cl.
    *A63F 13/86*     (2014.01)
    *A63F 13/61*     (2014.01)
    *A63F 13/355*     (2014.01)
    *A63F 13/323*     (2014.01)
    *A63F 13/48*     (2014.01)

(52) U.S. Cl.
    CPC .............. *A63F 13/355* (2014.09); *A63F 13/48* (2014.09); *A63F 2300/552* (2013.01)

(58) Field of Classification Search
    CPC ................ A63F 13/79; A63F 2300/206; A63F 2300/552; A63F 2300/6009; A63F 13/52; A63F 2300/201; A63F 2300/204; A63F 13/45; A63F 13/61; A63F 13/71; A63F 2300/407; H04L 67/06; H04L 67/10
    See application file for complete search history.

(56) References Cited

U.S. PATENT DOCUMENTS

| | | | |
|---|---|---|---|
| 7,415,707 B2 | 8/2008 | Taguchi | |
| 7,558,820 B2 | 7/2009 | Kimoto | |
| 7,887,418 B2 | 2/2011 | Kaminagayoshi | |
| 2001/0029205 A1 | 10/2001 | Taho | |
| 2001/0031665 A1 | 10/2001 | Taho | |
| 2002/0184499 A1 | 12/2002 | Taguchi | |
| 2003/0014479 A1* | 1/2003 | Shafron | G06F 17/30873 709/203 |
| 2003/0038805 A1 | 2/2003 | Wong | |
| 2003/0097400 A1 | 5/2003 | Li | |
| 2004/0006637 A1 | 1/2004 | Kuacharoen | |
| 2004/0040023 A1* | 2/2004 | Ellis | G06F 8/60 717/178 |
| 2005/0034123 A1 | 2/2005 | Shiomi | |
| 2005/0227766 A1 | 10/2005 | Kaminagayoshi | |
| 2006/0047946 A1 | 3/2006 | Keith, Jr. | |
| 2006/0098013 A1 | 5/2006 | Wong | |
| 2006/0205509 A1 | 9/2006 | Hirota | |
| 2006/0287106 A1 | 12/2006 | Jensen | |
| 2007/0060361 A1* | 3/2007 | Nguyen | G07F 17/32 463/42 |
| 2007/0117617 A1 | 5/2007 | Spanton | |
| 2007/0254742 A1* | 11/2007 | O'Brien | G07F 17/32 463/42 |
| 2008/0119286 A1* | 5/2008 | Brunstetter | A63F 13/00 463/43 |
| 2009/0023496 A1 | 1/2009 | Kataoka | |
| 2009/0064129 A1 | 3/2009 | Chen | |
| 2009/0111576 A1 | 4/2009 | Ostergren | |
| 2010/0210354 A1 | 8/2010 | Burak | |
| 2010/0313159 A1 | 12/2010 | Decker | |
| 2011/0032250 A1 | 2/2011 | Tanaka | |
| 2012/0004041 A1* | 1/2012 | Pereira | A63F 9/24 463/42 |
| 2012/0028700 A1 | 2/2012 | Avent | |
| 2014/0349753 A1 | 11/2014 | Imai | |

FOREIGN PATENT DOCUMENTS

| | | |
|---|---|---|
| JP | 08173634 A | 7/1996 |
| JP | 11347254 A | 12/1999 |
| JP | 2000157724 A | 6/2000 |
| JP | 2001340655 | 12/2001 |
| JP | 2002018144 A | 1/2002 |
| JP | 2002143566 A | 5/2002 |
| JP | 2002248273 | 9/2002 |
| JP | 2002318692 A | 10/2002 |
| JP | 2002333982 A | 11/2002 |
| JP | 2003088685 A | 3/2003 |
| JP | 2003164672 | 6/2003 |
| JP | 2003177932 A | 6/2003 |
| JP | 2003198614 A | 7/2003 |
| JP | 2005056416 A | 3/2005 |
| JP | 2005167298 A | 6/2005 |
| JP | 2005296419 | 10/2005 |
| JP | 2005296660 A | 10/2005 |
| JP | 2008067277 | 3/2008 |
| JP | 2008194312 | 8/2008 |
| JP | 4228576 B2 | 2/2009 |
| JP | 2009022365 | 2/2009 |
| JP | 2009230585 A | 10/2009 |
| JP | 2010040051 A | 2/2010 |
| JP | 2010042083 A | 2/2010 |
| JP | 4562156 B2 | 10/2010 |
| JP | 2011053785 A | 3/2011 |
| JP | 2011072735 A | 4/2011 |
| KR | 20030008201 A | 1/2003 |
| WO | 2008099867 A1 | 8/2008 |
| WO | 2013111248 A1 | 8/2013 |

OTHER PUBLICATIONS

Office Action for corresponding JP Application No. 2013-555017, dated Jun. 30, 2015.
International Preliminary Report on Patentability for related PCT Application No. PCT/JP2012/008352, dated Jul. 24, 2014.
Office Action for corresponding CN Application No. 2012800678432, 8 pages, dated Dec. 22, 2015.
Office Action for corresponding CN Application No. 201280067840.9, 5 pages, dated Dec. 22, 2015.
Office Action for corresponding CN Application No. 2012800678381, 8 pages, dated Dec. 22, 2015.
Office Action for corresponding JP Application No. 2013-555015, dated Feb. 17, 2015.
International Preliminary Report on Patentability for corresponding PCT Application No. PCT/JP2012/008348, dated Jul. 24, 2014.
International Preliminary Report on Patentability for corresponding PCT Application No. PCT/JP2012/008349, dated Jul. 24, 2014.
International Preliminary Report on Patentability for corresponding PCT Application No. PCT/JP2012/008350, dated Jul. 24, 2014.
International Preliminary Report on Patentability for corresponding PCT Application No. PCT/JP2012/008351, dated Jul. 24, 2014.
Naoki Nozawa, iPad Perfect Manual, 1st edition, Sotechsha Co., Ltd., Jun. 30, 2010 (Jun. 30, 2010), 2,3 pp. 189 to 206 (for relevancy see International Search Report for PCT Application No. PCT/JP2012/008348, dated Jan. 29, 2013).
International Search Report for related PCT Application No. PCT/JP2012/008348, dated Jan. 29, 2013.
International Search Report for corresponding PCT Application No. PCT/JP2012/008349, dated Mar. 19, 2013.
Nintendo, Wii de Virtual Console no Soft nado 0 Present dekiru Kino, [online], Impress Watch Corp., Dec. 11, 2007 (Dec. 11, 2007), 2 pages, retrieval date Mar. 6, 2013 (Mar. 6, 2013) <URL:http://bb.watch.impress.co.jp/cda/news/20373.html> (for relevancy see International Search Report for PCT Application No. PCT/JP2012/008349, dated Mar. 19, 2013).
International Search Report for related PCT Application No. PCT/JP2012/008350, dated Mar. 26, 2013.
International Search Report for related PCT Application No. PCT/JP2012/008351, dated Mar. 26, 2013.
Office Action for related U.S. Appl. No. 14/371,289, 8 pages, dated Aug. 26, 2016.
Office Action for related U.S. Appl. No. 14/371,320, 11 pages, dated Dec. 1, 2016.

(56) References Cited

OTHER PUBLICATIONS

Search Report for corresponding EP Application No. 12866876.1, 7 pages, dated Oct. 5, 2016.
Office Action for corresponding JP Application No. 2015-1777691, 8 pages, dated Jul. 12, 2016.
Search Report for related EP Application No. 12866637.7, 9 pages, dated Nov. 7, 2016.
Office Action for related EP Application No. 12866475.2, 12 pages, dated Nov. 15, 2016.
Office Action for related JP Application No. 2015-177691, 9 pages, dated Dec. 20, 2016.
Office Action for corresponding JP Application No. 2016026189, 17 pages, dated Feb. 7, 2017.
Office Action for related U.S. Appl. No. 14/371,328, 10 pages, dated Apr. 25, 2017.

* cited by examiner

102

102

102b

102a 102a,102b

INFORMATION PROCESSING APPARATUS AND INFORMATION PROCESSING SYSTEM FOR PERMITTING A FIRST USER TO ACCESS GAME SOFTWARE OF A SECOND USER OVER A NETWORK

TECHNICAL FIELD

The present invention relates to an information processing technology and, more particularly, to a technology for processing content such as games.

BACKGROUND ART

A mechanism has been set up that allows game devices to download game software from servers on the Internet and that allows multiple users to enjoy games together via the Internet. In recent years, portable game devices and tablet terminal apparatuses have become equipped with communication functions, and multi-functionalization of mobile phones has been developed. With communication functions, portable electronic devices allow the users to connect the electronic devices to the Internet also on the outdoors so as to acquire various types of information.

[Patent document No. 1] U.S. Pat. No. 7,558,820

DISCLOSURE OF THE INVENTION

Problem to be Solved by the Invention

The Internet connects users from all around the world without national borders and provides opportunities to get to know various types of people through games. Under such an environment, the emergence of a mechanism is desired that allows even more people to become effectively connected to one another and that can also provide entertainment. Such a new mechanism is also preferably provided for other applications besides games.

Means to Solve the Problem

An information processing apparatus according to one embodiment of the present invention includes: an acquisition unit configured to acquire image data in which game play is recorded or image data of a game currently being played; a display processing unit configured to display an image of game play using the acquired image data and to display an image for acquiring game software while the image of the game play is being displayed or after the completion of the display; a reception unit configured to receive an input operation in the image for acquiring the game software; a request generation unit configured to generate a request for downloading the game software; and a transmission unit configured to transmit the generated request for downloading.

Another embodiment of the present invention relates to an information processing system. The information processing system is provided with a first information processing apparatus, a second information processing apparatus, and a server, wherein the first information processing apparatus includes: a first acquisition unit configured to acquire image data in which game play is recorded or image data of a game currently being played; a display processing unit configured to display an image of game play using the acquired image data and to display an image for acquiring game software while the image of the game play is being displayed or after the completion of the display; a first reception unit configured to receive an input operation in the image for acquiring the game software; a request generation unit configured to generate a request for downloading the game software; and a transmission unit configured to transmit to a server the generated request for downloading. The server includes: a second reception unit configured to receive the request for downloading; and a transmission processing unit configured to transmit the game software identified by the request for downloading to the second information processing apparatus. The second information processing apparatus includes: a second acquisition unit configured to download the game software from the server.

Optional combinations of the aforementioned constituting elements and implementations of the invention in the form of methods, apparatuses, systems, recording mediums, and computer programs may also be practiced as additional modes of the present invention.

BEST MODE FOR CARRYING OUT THE INVENTION

Figure 1:
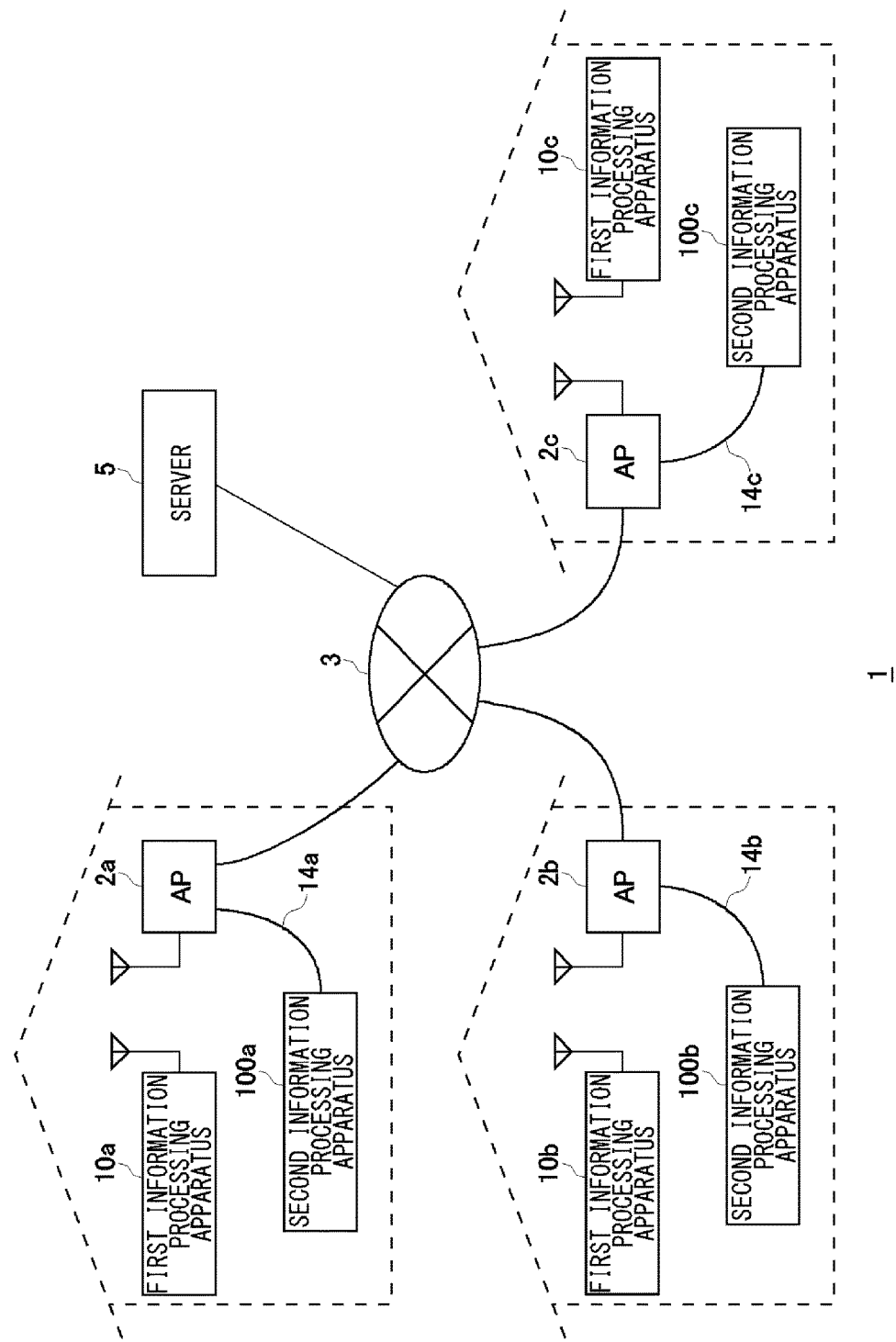
FIG. 1 is a diagram illustrating an example of the configuration of an information processing system according to an exemplary embodiment.

FIG. 1 illustrates an example of the configuration of an information processing system 1 according to an exemplary embodiment. In the information processing system 1, first information processing apparatuses 10a, 10b, and 10c are portable terminal apparatuses, and second information processing apparatuses 100a, 100b, and 100c are console terminal apparatuses. The first information processing apparatus 10a and the second information processing apparatus 100a are terminal apparatuses that are operated by a user A. The first information processing apparatus 10b and the second information processing apparatus 100b are terminal apparatuses that are operated by a user B. The first information processing apparatus 10c and the second information processing apparatus 100c are terminal apparatuses that are operated by a user C.

An AP (Access Point) 2 has functions of a wireless access point and a router and is placed indoors. An AP 2a is placed in a house of the user A, and the first information processing apparatus 10a and the second information processing apparatus 100a become connected to a network 3 such as the Internet via the AP 2a, a modem (not shown), or the like. An AP 2b is placed in a house of the user B, and the first information processing apparatus 10b and the second information processing apparatus 100b become connected to the network 3 via the AP 2b, a modem, or the like. An AP 2c is placed in a house of the user C, and the first information processing apparatus 10c and the second information processing apparatus 100c become connected to the network 3 via the AP 2c, a modem, or the like.

Hereinafter, the first information processing apparatuses 10a, 10b, and 10c are referred to as "first information processing apparatuses 10" when the first information processing apparatuses are not to be distinguished from one another, and the second information processing apparatuses 100a, 100b, and 100c are referred to as "second information processing apparatuses 100" when the second information processing apparatuses are not to be distinguished from one another.

A first information processing apparatus 10 has a communication function in a wireless LAN (Local Area Network) method and becomes connected to the AP 2 via a wireless LAN. The first information processing apparatus 10 may become connected to the AP 2 via a cable indoors. The first information processing apparatus 10 has a communication function in a method employed for mobile phones of the third generation mobile communication system or the like and can be connected to the network 3 via a mobile phone network. This allows the first information processing apparatus 10 to become connected to the network 3 via a base station with a wide-range communication area. Thus, the user can use the first information processing apparatus 10 also on the outdoors. In the present exemplary embodiment, a first information processing apparatus 10 is a portable terminal apparatus and is preferably usable by the user also on the outdoors. However, the first information processing apparatus may be a console terminal apparatus when achieving some functions that will be described later in the information processing system 1.

A second information processing apparatus 100 becomes connected to the AP 2 via a cable 14. The second information processing apparatus 100 may be connected to the AP 2 via a wireless LAN. The second information processing apparatus 100 is a console terminal apparatus in the present exemplary embodiment. Alternatively, the second information processing apparatus 100 may be a portable terminal apparatus.

A server 5 has a plurality of functions in the present exemplary embodiment. As one of the functions, the server 5 provides a network service to a user of the information processing system 1. The server 5 manages user accounts (network accounts) for identifying users on the network, and users sign in to a network service provided by the server 5 using respective user accounts. The first information processing apparatus 10 and the second information processing apparatus 100 sign in to the network service so as to upload image data to the server 5 and/or download image data from the server 5. In the information processing system 1 according to the present exemplary embodiment, a plurality of users can join an online game. The server 5 may function as a game server that manages a game session.

The server 5 functions as a content server that delivers content such as game software to the second information processing apparatus 100. The server 5 delivers content upon the receipt of an explicit request from the user. Alternatively, the server 5 may select content and then deliver the content. When the server 5 delivers content upon the receipt of an explicit request from the user, the content is generally subject to fees, and the server 5 performs content delivery processing as well as billing processing.

The server 5 functions as a game server or a content server. In FIG. 1, the server 5 is expressed as a server in which these functions are integrated. Therefore, the server 5 may be physically formed with a plurality of servers. In this case, IP addresses on the network may be separately assigned.

In the information processing system 1, first information processing apparatuses 10 and second information processing apparatuses 100 are connected such that the first information processing apparatuses 10 and the second information processing apparatuses 100 can transmit and/or receive data with one another via the server 5. More specifically, the first information processing apparatus 10a and the second information processing apparatus 100a owned by the user A, the first information processing apparatus 10b and the second information processing apparatus 100b owned by the user B, and the first information processing apparatus 10c and the second information processing apparatus 100c owned by the user C, can transmit and/or receive data with one another via the server 5.

The first information processing apparatus 10a and the second information processing apparatus 100a owned by the user A, the first information processing apparatus 10*b* and the second information processing apparatus 100*b* owned by the user B, and the first information processing apparatus 10*c* and the second information processing apparatus 100*c* owned by the user C, may directly transmit and/or receive data with one another (without going through the server 5). For example, while the user B is playing a game using the second information processing apparatus 100*b*, the second information processing apparatus 100*b* can directly deliver, by streaming, motion video image data of game play to the information processing apparatuses of the user A and the user C. A first information processing apparatus 10 and a second information processing apparatus 100 of the same user may transmit and/or receive data via an AP 2 or may transmit and/or receive data directly via a wireless LAN.

In the present exemplary embodiment, a first information processing apparatus 10 is a portable game device, and a second information processing apparatus 100 is a game console. The first information processing apparatus 10*a* and the second information processing apparatus 100*a* are operated by the user A and each transmit and/or receive data with the server 5 and with other information processing apparatuses using a user account (network account) identifying the user A. Similarly, the first information processing apparatus 10*b* and the second information processing apparatus 100*b* each transmit and/or receive data with the server 5 and with other information processing apparatuses using a network account identifying the user B, and the first information processing apparatus 10*c* and the second information processing apparatus 100*c* each transmit and/or receive data with the server 5 and with other information processing apparatuses using a network account identifying the user C.

In the information processing system 1 shown in FIG. 1, the information processing apparatuses of the three users are shown. However, in the actual environment, information processing apparatuses of uncountable users from all over the world are connected to the network 3. The number of information processing apparatuses operated by each user is not limited to two and may be more than two.

A use case of the information processing system 1 by the user A, who is a company employee, is shown in the following. The user A wakes up in the morning, eats breakfast, and then goes to work carrying the first information processing apparatus 10*a*. The user A works at a company during the day, comes back home at night, plays a game using the second information processing apparatus 100*a*, and then goes to sleep. A rough image is as follows: the user A makes preparations using the first information processing apparatus 10*a* when he/she is outside (outdoor time) in order to enjoy content after he/she comes back home, and, e.g., plays an online game with his/her friend(s) using the second information processing apparatus 100*a* when he/she is indoors (indoor time) after coming back home. The user A may play a game using the first information processing apparatus 10*a* during indoor time. Alternatively, the user A may use the first information processing apparatus 10*a* as a supplementary tool during game play using the second information processing apparatus 100*a*. In the information processing system 1, such behaviors of the user A are simulated as one use case. Depending on a life style of the user A, the information processing system 1 may be used in different variations.

<Use Case During Outdoor Time>

During outdoor time, the user A is watching live video images of a game X being played by the user B. During this time, the live video images are delivered by streaming to the first information processing apparatus 10*a* of the user A from the second information processing apparatus 100*b* of the user B. It is assumed that the user A does not possess the game X. If the user A considers that the game X is interesting and desires to purchase the game X after watching the game play of the user B, the user A purchases the game X by pressing a purchase button displayed in association with the live video images of the game X on the first information processing apparatus 10*a*. Upon the receipt of a request for purchasing the game X from the first information processing apparatus 10*a*, the server 5 transmits software of the game X to the second information processing apparatus 100*a*. The second information processing apparatus 100*a* automatically downloads the software of the game X. Therefore, a situation can be created where the software of the game X has already been downloaded onto the second information processing apparatus 100*a* by the time the user A comes back home. During the outdoor time, the second information processing apparatus 100*a* is in a sleep state where the second information processing apparatus 100*a* monitors for an instruction from the server 5. Upon the receipt of an instruction from the server 5, the second information processing apparatus 100*a* turns the main power on so as to operate to download game software from the server 5. Upon completion of the downloading, the second information processing apparatus 100*a* may return to the sleep state again.

The user A may view play motion video of the game X that has been played by the user B or another user in the past. Play motion video of the past are stored in the server 5, and the first information processing apparatus 10*a* of the user A accesses the server 5 and acquires play motion video. Play motion video of other users are, e.g., motion video of perfect play of a master class, and the user A can increase motivation to play the game X by watching other user's play motion video. In this case, a purchase button is also displayed on the first information processing apparatus 10*a*, and the server 5 transmits the software of the game X to the second information processing apparatus 100*a* upon the pressing of the purchase button by the user A. As described, by mapping an action of viewing live video images or past play motion video of the game X to an action of purchasing the game X, access to a game store (server 5) can be made easy. Thus a user-friendly content purchasing system can be realized.

If the user A and the user B have the same game, it is preferred to create an environment for making a schedule for having game play together. Thus, in the information processing system 1, the user A can schedule a time for a match for a game Y, which both users have, with the user B. For example, the first information processing apparatus 10*a* of the user A transmits an invitation for a match with a specified time for the match to both the first information processing apparatus 10*b* and the second information processing apparatus 100*b* of the user B, and the match can be promised when a reply indicating acceptance is received from the user B. As described, the user can easily make a plan for after coming back home when the user A is outside, and the user A can play a match for the game Y with the user B at a promised time after coming back home.

Regardless of whether it is an outdoor time or an indoor time, the server 5 can autonomously provide various types of information to the second information processing apparatus 100*a*. The information to be provided may be the most popular game title in the world or demonstration motion video of such a game. Friends of the user A can give presents to the user A. An example of the presents is game software, and the server 5 transmits game software to the second information processing apparatus 100*a* upon the receipt of an instruction for giving the present to the user A from a friend. As described, the server 5 transmits information to the second information processing apparatus 100*a* so that the second information processing apparatus 100*a* presents various types of information to the user A.

<Use Case During Indoor Time>

After coming back home, the user A turns on the main power of the second information processing apparatus 100*a*. A camera is connected to the second information processing apparatus 100*a*, and the second information processing apparatus 100*a* identifies (authenticate) the user A upon receiving an image captured by the camera. When the second information processing apparatus 100*a* identifies the user A, the second information processing apparatus 100*a* logs in using an account (local account) of the identified user A and automatically signs in to a network service provided by the server 5 using the network account. When the second information processing apparatus 100*a* is started, a menu screen image is displayed first. A local account is a user account that is registered in the second information processing apparatus 100 to uniquely identify the user.

The menu screen image displays the latest information transmitted to the user A, the information on content that is automatically downloaded, and the like. The user A can open a list screen image of downloaded content from the menu screen image. The list screen image includes an icon of the game X that has been purchased by the user A through the first information processing apparatus 10*a* and that has been automatically downloaded onto the second information processing apparatus 100*a*, an icon of a game demo provided from the server 5, and the like. When the user A selects the icon of the game X, the software of the game X is installed such that the game X can be played. As described, the software of the game X is automatically downloaded during the outdoor time of the user A in the information processing system 1. Thus, the user A can play the game without downloading the software of the game X after coming back home. When the user A instructs to purchase the game X through the first information processing apparatus 10*a*, the first information processing apparatus 10*a* may instruct the second information processing apparatus 100*a* to automatically start the game X when the power is turned on. In this case, when the main power is turned on, the second information processing apparatus 100*a* automatically installs the downloaded software of the game X and also automatically starts the software of the game X. Therefore, the user can play the game X just by turning the main power on.

The menu screen image also displays the information on the schedule promised to the user B during the outdoor time. With this, the user A can remember the promise made to the user B by viewing the menu screen image. An example has been shown where the user A voluntarily asks the user B for a match. However, the server 5 may select an opponent candidate on its own by analyzing the tendency of play or the like of the user A and transmit the information on the opponent candidate to the second information processing apparatus 100*a* in advance, and the second information processing apparatus 100*a* may display the information on the menu screen image. The user A transmits an invitation for a match with a specified time for the match to the opponent candidate selected by the server 5, and the match can be promised when a reply indicating acceptance is received from the opponent candidate. If the opponent candidate has already transmitted an invitation for a match to the user A, the menu screen image indicates that there is a notice for the invitation for the match, and the user A can promise the match to the opponent candidate by sending a reply indicating acceptance.

As described, when a match is promised between the users, the respective second information processing apparatuses 100 of the users register scheduling information thereof. At a scheduled time, the second information processing apparatus 100*a* automatically starts the game and connects to the second information processing apparatus 100 of the opponent so as to create an environment for the match. If the environment for the match cannot be created, e.g., if the main power of the second information processing apparatus 100 of the opponent cannot be turned on, thus failing to get a connection, the second information processing apparatus 100*a* may notify the server 5 accordingly. The server 5 notifies the first information processing apparatus 10 of the opponent of a message reminding the opponent of the promised match at this time. If the user A is playing another game at a time for the match, the second information processing apparatus 100*a* may display a message indicating that it is a time for the match.

The menu screen image also displays information indicating that a message has been transmitted from a friend. This corresponds to a mailer function, and audio or image messages can be transmitted from a friend as well as text messages.

In the second information processing apparatus 100*a*, respective user accounts of friends of the user A are registered. Friends to be registered include acquaintances in the real world and friends the user A has become acquainted with through the information processing system 1. The second information processing apparatus 100*a* acquires activities including status information on registered friends from the server 5, and the user A can view a list of activities of each friend. The activities include information indicating whether or not the friend is being connected to the network 3, a game title being played by the friend, and the like. The user A can check the status of a friend by viewing his/her activities. For example, the user A can learn that the user C has not yet turned on the power of the second information processing apparatus 100*c* and that the user B has already started playing the game. Registration of respective accounts of friends of the user A may be performed only on the server 5. When the second information processing apparatus 100*a* requests the server 5 for activities of the friends, the server 5 may transmit an activity list of the friends of the user A to the second information processing apparatus 100*a*.

When the user A selects one friend from the activity list in the second information processing apparatus 100*a*, the second information processing apparatus 100*a* transmits information identifying the selected friend to the server 5, and the server 5 returns activity information including detailed status information of the friend to the second information processing apparatus 100*a*. The server 5 also includes, in the activity information, an IP address of a second information processing apparatus 100 of the friend at this time so as to send a reply. With this, the user A can view the detailed activities of the friend. The user A can watch live streaming of ongoing play by the friend or watch play motion video of the friend of the past through an activity detail screen image. The live streaming may be, for example, directly delivered from the second information processing apparatus 100*b* of the user B. When watching live video images of ongoing play, detailed metadata such as stage information may be set to be viewable so that the user A can easily understand the status of the friend's play.

As explained regarding the outdoor time, the user A can easily purchase content through the first information processing apparatus 10a of a portable type. The user A can also purchase content easily through the second information processing apparatus 100a. For example, when the user A selects a game title, a live video image, or the like included in activities of a friend, a purchase screen image may be provided from the server 5 and displayed on a display of the second information processing apparatus 100a. As described, in the information processing system 1, there are many paths to a content purchase screen image that have been prepared with ingenuity allowing the user to immediately purchase content the user desires to purchase.

If the data size of content is large when purchasing the content through the second information processing apparatus 100a, it takes a long time for downloading the content. Therefore, the information processing system 1 is designed such that, when a part of content is downloaded, the second information processing apparatus 100a installs the part of the content so as to allow the user A to start executing the content with a short wait time. For example, if a game comprises a plurality of stages, the server 5 first transmits software for executing a first stage to the second information processing apparatus 100a, and the second information processing apparatus 100a installs the software so that the user A can play the first stage. While the user A is playing the first stage, the server 5 continues to transmit software for playing second and subsequent stages to the second information processing apparatus 100a so that all the stages can be played eventually. As described, by allowing software for playing the second and subsequent stages to be downloaded in the background, the user A only needs to wait for the amount of time required for downloading the first stage. Thus, a wait time required until the start of the game can be shortened.

The server 5 may recommend a purchase of a game that matches the preference of the user A in accordance with a tendency of play of the user A. In any case, the server 5 may recommend a game that matches the preference of the user A so as to increase the interest of the user A on the game. The server 5 may voluntarily transmit information regarding a game recommended to be purchased to the second information processing apparatus 100a and include the information on the menu screen image. In any case, the server 5 can recommend a game that matches the preference of the user A so as to increase interest of the user A in the game.

When the user A selects an icon of a game on the menu screen image, the selected game is started, and the user A starts game play. The second information processing apparatus 100a can pause the progress of the game when the user A presses a pause button during the game play. For example, when the user A is playing a game with another user, the game may be set such that the progress cannot be paused even when the user A presses the pause button by invalidating the button operation.

If the pausing of a game when the pause button is pressed is allowed, the game may be paused, and a menu screen image may be displayed over a game screen image. In conventional game devices, the screen image does not go back to a menu screen image until the game is once ended. However, in the second information processing apparatus 100a, the screen image is set to go back to a menu screen image just by pausing the game. This allows the user A to view activities of his/her friends so as to take action such as checking the status of the friends and purchasing a new game and quickly return to the game. The second information processing apparatus 100a may display a screen image related to a game that is paused. For example, a purchase screen image of a game related to the paused game or a screen image of a walkthrough site of the paused game may be displayed.

A browser function may be set to be started up even when the game is not paused so that the user A can access the walkthrough site of the game. In this case, it is preferred that a browser screen image be displayed at the edge of a display screen image in such a manner that the browser screen image does not interfere the progress of the game so that the user A can view a desired site while playing the game.

In the information processing system 1, a mechanism is provided where play motion video of a user is uploaded onto the server 5 such that another user can view the play motion video. Various advantages are provided by viewing this play motion video. For example, the user can learn what kind of game his/her friend has played in the past, and the user can easily open a game purchase screen image. As a mechanism for recording play motion video, the second information processing apparatus 100a records play video images for a length of a predetermined period of time (e.g., several tens of seconds) at all times. As the recorded length of play video images exceeds the predetermined period of time, the play video images are overwritten in the order from the old one. Therefore, the second information processing apparatus 100a records the latest play video images of a recorded length of the predetermined period of time. For example, in a case where the user A defeats the last boss, play video images being recorded at that moment can be saved by pressing a predetermined button (capture button) of a game controller. In this way, the video images of game play when the last boss was defeated are saved. Motion video data saved in this way is automatically uploaded onto the server 5 or directly transmitted to friends, serving to help increase interest in the game of a user viewing the motion video data. Saved motion video data may be periodically uploaded onto the server 5.

The user A captures motion video data in the above. Alternatively, a game may autonomously capture motion video data. An instruction for capturing may be issued at the time when the game detects a generated event (e.g., a goal in a soccer game) so that scenes before and after the event can be recorded. Also, system software of the second information processing apparatus 100a may issue an instruction for capturing when, for example, the user A wins an award (trophy) during the game so as to record scenes before and after winning the trophy. The system software may issue an instruction for capturing at every predetermined period of time so as to capture play motion video at each predetermined period of time.

When captured play motion video is uploaded onto the server 5, privacy settings may be set for the play motion video. The privacy settings are settings that allow only specific users to view play motion video. For example, the play motion video may be only viewable to friends (managed in the server 5) of the user A. Privacy settings may be different for play motion video captured by a user and for play motion video captured by a game or system software. The user A knows that play motion video captured by the user A will be uploaded. On the other hand, since play motion video captured by a game or system software has not been captured based on the user's intention, the user may feel resistance in the uploading of the play motion video. Therefore, play motion video captured by a game or system software may be set such that the play motion video will not be uploaded or will not be viewable even if the play motion video is to be uploaded. It is preferred that the user A can set ON and OFF of an automatic capture function of a game or system software and that the user A can set ON and OFF of an automatic upload function when the automatic capture function is ON.

In order for the user to learn various ways of enjoying a game, the server 5 collects various types of play motion video from users all over the world. For example, the server 5 collects play motion video of scenes obtained when a world record is achieved or when extremely uncommon events have occurred in a car racing game. The user can access the server 5 to view favorite play motion video. This leads to an increase in the interest in the new game or to the discovery of an interesting play style if the user already has the game.

By managing activity information among friends in advance, the server 5 identifies, for example, a user who has achieved the fastest lap in a car racing game. When a certain user newly establishes the fastest lap, the server 5 may notify the user's friends, who have the car racing game, of the establishment of the fastest lap. This provides motivation to play the car racing game to the friends and develops a sense of competition among the friends, thus contributing to the enhancement of communication among the friends. In particular, advantages can be also expected in a case where the game is relatively old. For example, the friends may be reminded of the game again after a long time, and the game may become a hit again among the friends.

During game play, the user A basically progresses the game using the second information processing apparatus 100a and a game controller thereof. The information processing system 1 provides a mechanism where the first information processing apparatus 10a can be also effectively used at this time. The user A connects the first information processing apparatus 10a to the second information processing apparatus 100a via the server 5 so that the first information processing apparatus 10a records play video images of the second information processing apparatus 100a. For example, the user A may upload recorded play motion video to a SNS (Social Networking Service) or the like. If the second information processing apparatus 100a is executing a karaoke application, the first information processing apparatus 10a may be used to select a next song. A highly useful information processing system 1 can be realized by using the first information processing apparatus 10a effectively both outdoors and indoors, as described above.

If the user A goes to the user B's house and plays a game together using the second information processing apparatus 100b of the user B, the first information processing apparatus 10a of the user A can be connected to the second information processing apparatus 100b. This connection is achieved via the server 5. For example, the first information processing apparatus 10a accesses the server 5 so as to display a friend list on the display apparatus 20 and then selects the user B from the friend list so as to display activities of the user B. The activities display a game title the user B is currently playing with the user A. When the user A selects to play together for the game title, the server 5 provides information such as an IP address of the second information processing apparatus 100b. With this, the first information processing apparatus 10a can be directly connected to the second information processing apparatus 100b. The first information processing apparatus 10a may be directly connected to the second information processing apparatus 100b via a wireless LAN. In this case, the second information processing apparatus 100b displays a dialogue asking whether or not to connect to the first information processing apparatus 10a, and the first information processing apparatus 10a and the second information processing apparatus 100b are connected if the user B accepts the connection.

With this, the first information processing apparatus 10a can acquire various types of information from the second information processing apparatus 100b. For example, the first information processing apparatus 10a can acquire information such as a game title being played and the name of the user B from the second information processing apparatus 100b. For example, when an image of the user A and the user B playing a game together is captured by the front camera 30, the game title, the name of the user B, etc., can be included in the data of the captured image. Even when the above karaoke application is being played, the first information processing apparatus 10a may be used as a controller for the second information processing apparatus 100b. As described, the first information processing apparatus 10a and the second information processing apparatus 100b with different network accounts can collaboratively operate, and a highly useful information processing system 1 can thus be realized.

Furthermore, the information processing system 1 can operate not only for this system but also in cooperation with another game system. For example, game settings created in another game system can be also used in the information processing system 1. By allowing games played on different platforms to interact, as described above, the user friendliness can be improved.

An explanation is now given of a mechanism where a plurality of users play a game. The plurality of users have the same game Y and can play an online game using a second information processing apparatus 100 of any one of the users or a game server as a host. This mode is called "multiplayer play." For example, if the second information processing apparatus 100b of the user B serves as a host, the second information processing apparatus 100a of the user A acquires game session information (session ID) of the second information processing apparatus 100b and communicates with the second information processing apparatus 100b using the session ID. In order for the second information processing apparatus 100a to become connected to the second information processing apparatus 100b, it is necessary to go through a procedure where the second information processing apparatus 100b transmits an invitation to the second information processing apparatus 100a and where the second information processing apparatus 100a then expresses intent for participation, or a procedure where the second information processing apparatus 100a makes a participation request to the second information processing apparatus 100b and where the second information processing apparatus 100b then accepts the participation request. If a schedule for a match has been set in advance, as described above, either the second information processing apparatus 100a or the second information processing apparatus 100b may serve as a host, and procedures for participation requests, etc., may be executed in the background so that the both apparatuses are automatically connected.

In the information processing system 1, the user A can view live video image of the user B's play on a display and make a participation request at this time. After the user A's participation is accepted, the second information processing apparatus 100a starts the game Y. The amount of time required for the activation depends on a game. It often takes at least about several tens of seconds. In a conventional game device, a start-up screen image indicating a game title, etc., is displayed during the starting-up of a game. In the information processing system 1, such a start-up screen image is not displayed (or inconspicuously displayed). Although a start-up screen image is not displayed, necessary logos and the like may be displayed. During the activation of game software in the second information processing apparatus 100a, the user B's live video image continues to be displayed on the display so as to create a state where the user A has already joined before the user A notices it, upon completion of the activation in the background of a game. For example, in a case where the user B is operating one of players playing for doubles in a tennis game, by the time the user A is allowed to join upon completion of the start-up of the tennis game in the second information processing apparatus 100a, the user A will be able to operate the other player playing for the doubles in a live video image before the user A knows it. In reality, the live video image of the user B have been switched to a game screen image created by the second information processing apparatus 100a already by this time. By providing an interface that allows the user A to seamlessly join the user B's game as described above, the user A can be offered a feeling of already being in the game by the time the user A noticed it, without getting bored while spending time required for the activation of the game.

When starting the game in the second information processing apparatus 100a, a start-up screen image by the game and live video image of the user B provided by the system software may be displayed concurrently. In a scene where a logo that needs to be displayed on the start-up screen image appears, the game may notify the system software of the timing of the appearance, and the start-up screen image may be displayed while hiding the live video image in the scene. The system software may acquire file information of the logo that needs to be displayed from the game, and the system software may display the logo. When concurrently displaying the start-up screen image and the live video image of the user B, the screen may be separated into top and bottom portions or right and left portions so as to display the images. Alternatively, the images may be composed to be translucent for display.

There are also games that only allow participation at a break between stages. Even in this case, an environment can be created where the user A can join immediately when the progress of the game made by the user B comes to a break between stages, by starting the game Y in the background by the second information processing apparatus 100a while the user A is watching the user B's play. The second information processing apparatus 100 may have an AV player capable of reproducing a video image so as to be able to reproduce content such as a movie, e.g., before the participation is allowed.

The second information processing apparatus 100b that serves as a host offers a forum for having a review session when multiplayer play is ended. The second information processing apparatus 100b acquires 3D graphic data, information such as the locus of a player, and game data (including game controller operation information) for the multiplayer play from the game and provides a replay screen image and the like to participant users. Such a replay screen image is provided to all the participant users so that the participant users can concurrently view the replay screen image. The second information processing apparatus 100b serves as a host for a chat and allows a text chat, a video chat, or the like to be conducted among the participant users at this time. By allowing a game screen image to be also reproduced from a viewpoint different from the play status of the game, discussions can be made on actual mistakes and the like in aspect of strategies, and the reviews can be used for next game play.

It is a conventional practice to have a mechanism where a predetermined award such as a trophy is provided to the user when the user satisfies predetermined conditions (missions, tasks, etc.) that are set in the game, in order to keep the user's motivation for the game. A reward such as a trophy is provided when a condition set in the game is cleared. Therefore, a reward is used as an indicator of the degree of proficiency in the game. On the other hand, there is no indicator for evaluating a play style of a user when a plurality of users play a game together. In other words, an indicator for indicating whether or not the play of a game is good is a conventional practice. However, besides this indicator, no indicator for evaluating a user conventionally exists. Thus, focusing on how efficiently the game should be played is conventionally the most common way of having fun.

Thus, in the information processing system 1, variations of the user's way of enjoying a game are increased by introducing a new indicator for evaluating the user. A new multiplayer form can be achieved in a game executed in the information processing system 1. In normal multiplayer play, a participant user can join a game when the participant user obtains permission of a host user. In a new mode, a participant user joins a game without obtaining permission of a host user. Since the host user does not know that another user has joined the game, the host user persistently progresses the game as single-player play. The participant user can secretly help or, conversely, interrupt a player character of the host user. For example, the participant user can help the player character by defeating an enemy of the player character without letting the host user notice or can interrupt the player character by joining the game as an enemy of the player character.

Such play of the participant user is detected by the game and used to determine profile information of the participant user in the server 5. For example, as a user profile, the server 5 sets two indicators and determines level values thereof based on the play status. A first indicator shows a level for cooperative play for the host user, and a second indicator shows a level for uncooperative (interfering) play for the host user. These level values of the indicators are increased in accordance with the number of events of participation made by the user and/or the degree of cooperation or interference.

Conditions for satisfying the first and the second indicators are set in advance in the game. For example, a condition related to the first indicator is to defeat a predetermined number of enemies that exist in the direction of the progress of the player character during the game, and a condition related to the second indicator is to hit a predetermined number of attacks on the player character. Such conditions may be set uniquely by a game. A game may set a plurality of conditions. When such conditions are satisfied, the game notifies the server 5 accordingly. With this, the server 5 updates the level value of each indicator in the profile information of the participant user. The respective level values of the first and second indicators are increased by accumulation of profile information over a plurality of games by the server 5. If the level of the first indicator of a given user is high, it is found that the user has a strong tendency to play extremely cooperatively (devotedly) for a player character. If the level of the second indicator is high, it is found that the user has a strong tendency to play uncooperatively (interferingly) for the player character. The levels are incorporated in activities and used as information that represents the play style of the user.

As a different mode of multiplayer play, a user who plays earlier can also leave items to his/her friend during the game. Since the users play the game at a different time, the play is not multiplayer play in a strict sense. The user who plays first leaves an item to his/her friend at a certain stage, and the friend who plays later can acquire the left item when the friend enters the stage. This is achieved by registering in the server 5 information indicating that the user has left the item by the preceding user in advance and then by notifying the game of the friend of the information by the server 5. It is also possible for the user to uniquely make a mini game during the game, offering a feeling of playing the game together to users who are playing at a different time.

The above multiplayer play is based on the premise that a plurality of users have the same game Y. As described previously, the user A can view play motion video of the user B in real time in the information processing system 1. If the user A attempts to join the game in multiplayer play, the user A has to possess the game Y. However, the user A does not always possess the game Y at that time. Thus, the information processing system 1 provides a mechanism where the user A can join the game Y even in such a case.

A participation mode of the user A at this time is called "remote play." When the user A is permitted to join by the user B, the second information processing apparatus 100*a* of the user A transmits game controller operation information to the second information processing apparatus 100*b* of the user B, and the second information processing apparatus 100*b* transmits a game video image generated in accordance with the operation information to the second information processing apparatus 100*a*. In other words, in remote play, the respective game controllers of the user A and the user B transmit operation information to the second information processing apparatus 100*b* of the user B, and the second information processing apparatus 100*b* processes the operation information from the respective game controllers. With this, even if the user A does not have the game Y, the user A can enjoy the game Y with the user B.

When a plurality of users play a game using a conventional game device, a single screen image is generally divided into a plurality of screen images so as to display game images for respective users on the respective split screen images. In the remote play, the second information processing apparatus 100*b* may transmit a single screen image of the game to the second information processing apparatus 100*a* or may transmit only a game screen image split for the user A. Regarding a game that outputs a screen image to a 3DTV compatible with shutter glasses and that can alternately provide two users the respective game screen images of the users, the game screen images for the respective users may be provided to the respective users.

As one use case of remote play, the user A can be in charge of a game operation during the user B's play. For example, it is a case where the user B asks the user A to beat an enemy character the user B cannot beat. Putting the user B's game controller into the user A's hands is the image for this. The user A, instead of the user B, operates the player character of the user B in the second information processing apparatus 100*b*.

As described above, the information processing system 1 provides the user with various utilization modes. In the following, an explanation is given regarding the respective configurations of a first information processing apparatus 10 and a second information processing apparatus 100, and an explanation is given regarding the details of several features of the information processing system 1.

An explanation is given regarding the exterior configuration and circuit configuration of a first information processing apparatus 10 according to the present exemplary embodiment. The first information processing apparatus 10 shown in the following is a portable game device. Alternatively, the first information processing apparatus may be a portable terminal apparatus of other types. In order to achieve the several utilization modes of the information processing system 1, the first information processing apparatus 10 may be a console-type terminal apparatus as well as a portable terminal apparatus.

[Configuration of Front Surface Portion]

Figure 2A:
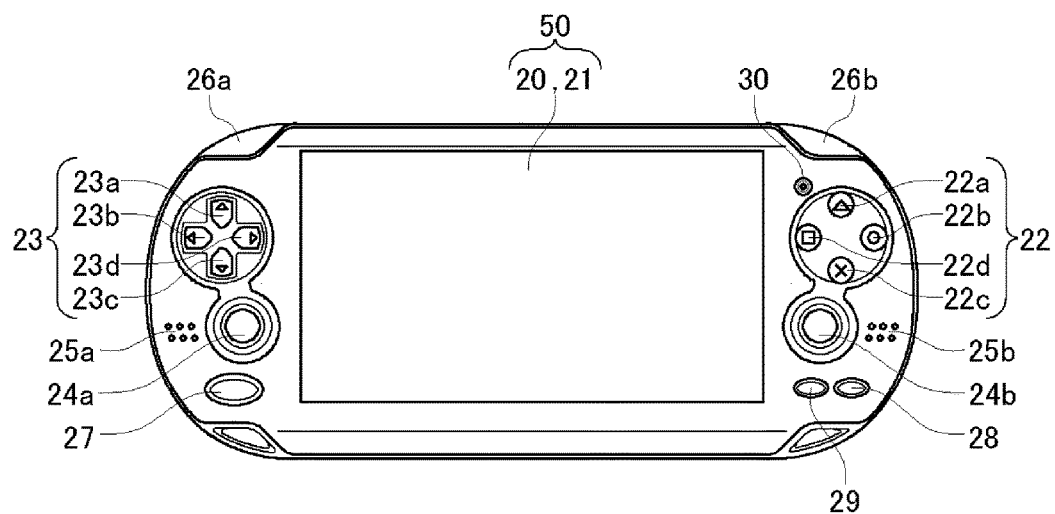
FIG. 2A is a diagram illustrating the front surface of a first information processing apparatus.

FIG. 2A illustrates the front surface of a first information processing apparatus 10. The first information processing apparatus 10 is formed of a horizontally-long housing, and the left and right areas held by the user each have an arc-shaped outline contour. A rectangular touch panel 50 is provided on the front surface of the first information processing apparatus 10. The touch panel 50 comprises a display apparatus 20 and a transparent front touch pad 21 that covers the surface of the display apparatus 20. The display apparatus 20 is an organic EL (Electro-Liminescence) panel and displays an image. The display apparatus 20 may be a display means such as a liquid crystal panel or the like. The front touch pad 21 is a multi-touch pad having a function of detecting a plurality of points that are touched concurrently, and the touch panel 50 is formed as a multi-touch screen.

A triangle button 22*a*, a circle button 22*b*, a cross button 22*c*, and a square button 22*d* each located at a vertex of a rhomboid (hereinafter, generically referred to as "operation buttons 22") are provided on the right side of the touch panel 50. An up key 23*a*, a left key 23*b*, a down key 23*c*, and a right key 23*d* (hereinafter, generically referred to as "directional keys 23") are provided on the left side of the touch panel 50. The user can input eight directions, up, down, left, and right directions and oblique directions, by operating the directional keys 23. A left stick 24*a* is provided below the directional keys 23, and a right stick 24*b* is provided below the operation buttons 22. The user tilts the left stick 24*a* or the right stick 24*b* (hereinafter, generically referred to as "analog sticks 24") so as to input a direction and the amount of a tilt. An L button 26*a* and an R button 26*b* are provided at the left and right top of the housing, respectively. The operation buttons 22, the directional keys 23, the analog sticks 24, the L button 26*a*, and the R button 26*b* form operation means operated by the user.

A front camera 30 is provided near the operation buttons 22. A left speaker 25*a* and a right speaker 25*b* that output sounds (hereinafter, generically referred to as "speakers 25") are provided on the left side of the left stick 24*a* and on the right side of the right stick 24*b*, respectively. A HOME button 27 is provided below the left stick 24*a*, and a START button 28 and a SELECT button 29 are provided below the right stick 24*b*.

[Configuration of Rear Surface Portion]

Figure 2B:
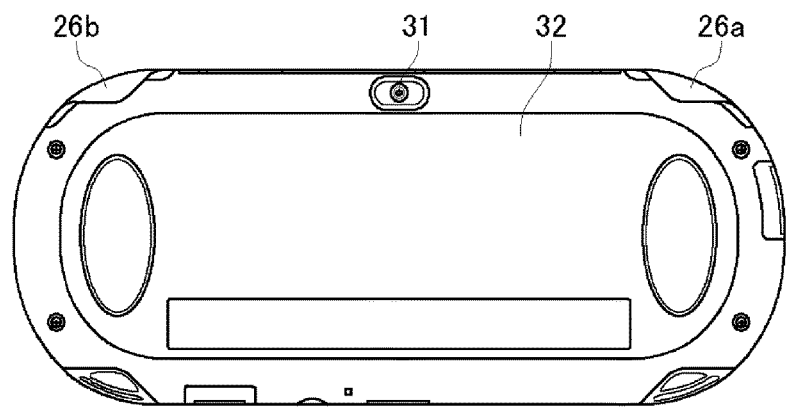
FIG. 2B is a diagram illustrating the rear surface of the first information processing apparatus.

FIG. 2B illustrates the rear surface of a first information processing apparatus 10. A rear camera 31 and a rear touch pad 32 are provided on the rear surface of the first information processing apparatus 10. The rear touch pad 32, as in the case of the front touch pad 21, is formed as a multi-touch pad. The first information processing apparatus 10 is provided with the two cameras and touch pads on the front and rear surfaces.

[Configuration of Top Surface Portion]

Figure 3A:
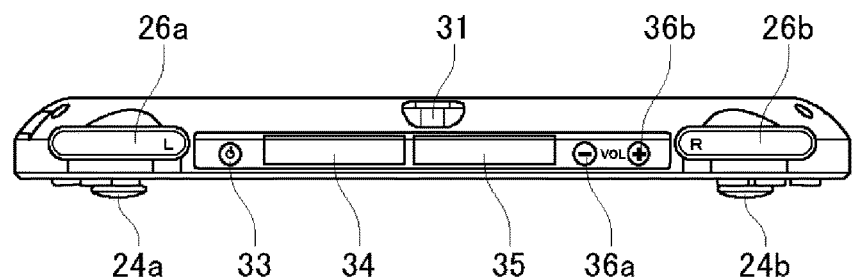
FIG. 3A is a diagram illustrating the upper surface of the first information processing apparatus.

FIG. 3A illustrates the upper surface of the first information processing apparatus 10. As described previously, the L button 26a and the R button 26b are provided at the left and right edges of the upper surface of the first information processing apparatus 10, respectively. A power button 33 is provided on the right side of the L button 26a, and the user turns the power on or off by pressing the power button 33 for at least a predetermined period of time (e.g., two seconds). The first information processing apparatus 10 has a power control function of transitioning to a suspend state when a time period during which the operation means is not operated (no operation time period) lasts for a predetermined period of time. When the first information processing apparatus 10 enters the suspend state, the user can bring the first information processing apparatus 10 back to an awake state from the suspend state by pressing the power button 33 for a short period of time (e.g., two seconds or less).

A game card slot 34 is a slot for inserting a game card. In the figure, the game card slot 34 covered by a slot cover is shown. An LED lamp that flashes when the game card is being accessed may be provided near the game card slot 34. An accessory terminal 35 is for connecting peripheral devices (accessories). In the figure, the accessory terminal 35 is shown being covered by a terminal cover. A negative button 36a and a positive button 36b for adjusting the volume are provided between the accessory terminal 35 and the R button 26b.

[Configuration of Bottom Surface Portion]

Figure 3B:
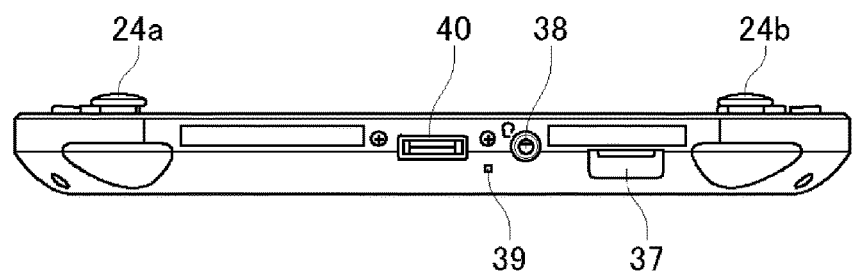
FIG. 3B is a diagram illustrating the bottom surface of the first information processing apparatus.

FIG. 3B illustrates the bottom surface of the first information processing apparatus 10. A memory card slot 37 is a slot for inserting a memory card. In the figure, the memory card slot 37 covered by a slot cover is shown. A sound input and output terminal 38, a microphone 39, and a multi-use terminal 40 are provided on the bottom surface of the first information processing apparatus 10. The multi-use terminal 40 is compatible with a USB (Universal Serial Bus) and can be connected to other devices via a USB cable.

[Configuration of Left Side Surface Portion]

Figure 3C:
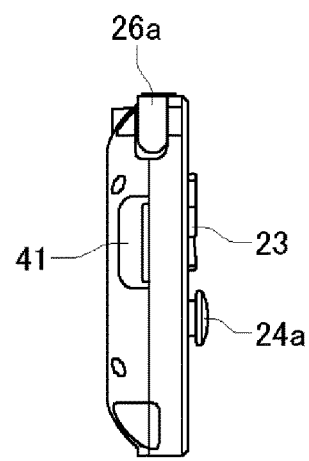
FIG. 3C is a diagram illustrating the left side surface of the first information processing apparatus.

FIG. 3C illustrates the left side surface of the first information processing apparatus 10. A SIM card slot 41 serving as a slot for inserting a SIM card is provided on the left side surface of the first information processing apparatus 10.

[Circuit Configuration of First Information Processing Apparatus 10]

Figure 4:
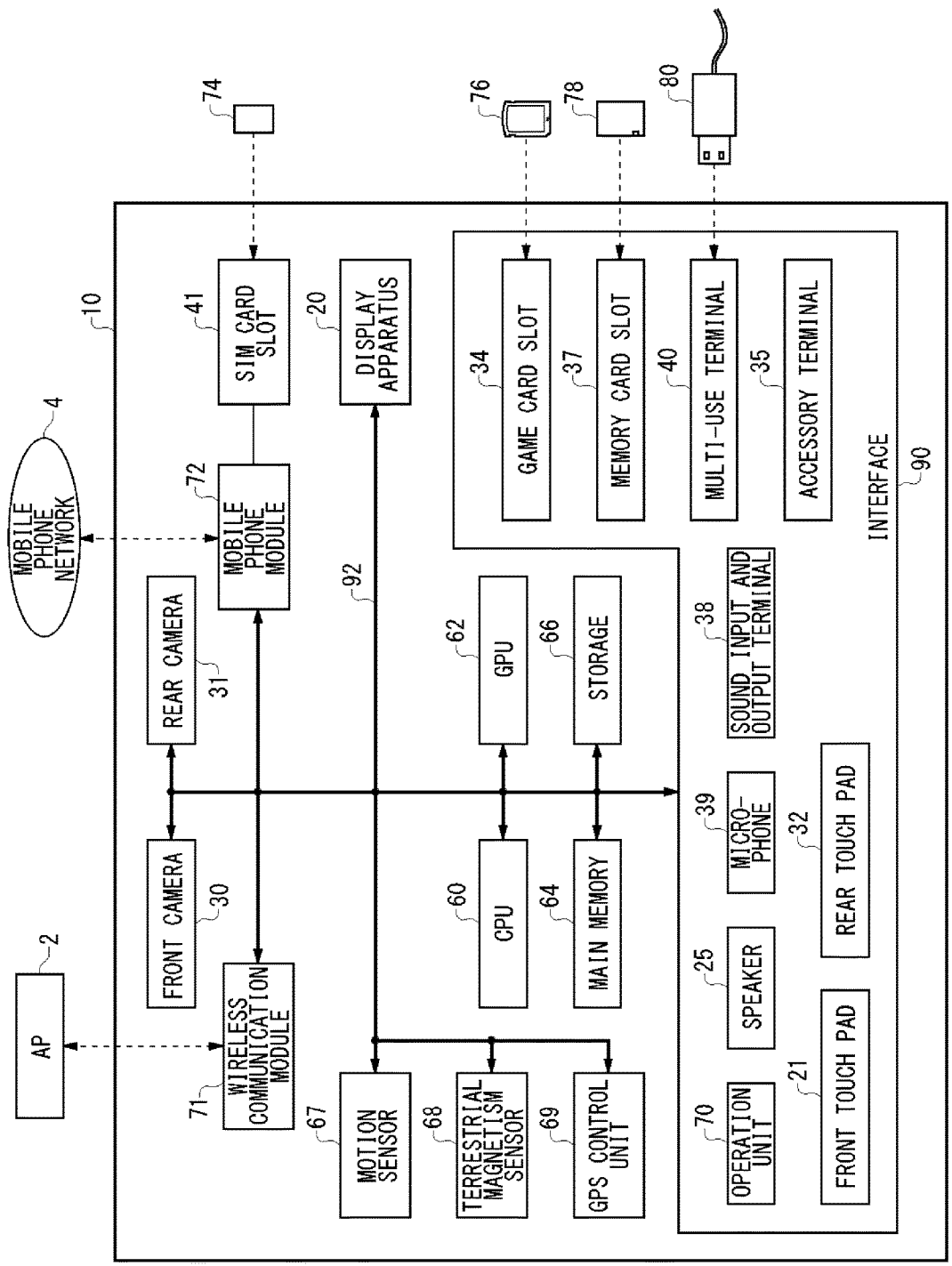
FIG. 4 is a diagram illustrating the circuit configuration of the first information processing apparatus.

FIG. 4 illustrates the circuit configuration of the first information processing apparatus 10. Components thereof are connected to one another via a bus 92. A wireless communication module 71 is formed with a wireless LAN module that complies with the communication standard of IEEE 802.11 b/g or the like and is connected to an external network via an AP 2. The wireless communication module 71 may have a communication function in Bluetooth (registered trademark) protocol. A mobile phone module 72 is compatible with a 3rd generation digital mobile phone method that complies with the IMT-2000 (International Mobile Telecommunication 2000) standard set by ITU (International Telecommunications Union) and is connected to a mobile phone network 4. A SIM card 74 in which a unique ID number for identifying the phone number of a mobile phone is recorded is inserted into the SIM card slot 41. The SIM card 74 being inserted into the SIM card slot 41 allows the mobile phone module 72 to communicate with the mobile phone network 4.

A CPU (Central Processing Unit) 60 executes a program or the like loaded in a main memory 64. A GPU (Graphics Processing Unit) 62 performs calculation necessary for image processing. The main memory 64 is configured with RAM (Random Access Memory) or the like and stores a program or data used by the CPU 60. A storage 66 is configured with a NAND-type flash memory or the like and used as a built-in auxiliary storage device.

A motion sensor 67 detects the behavior of the first information processing apparatus 10, and a terrestrial magnetism sensor 68 detects terrestrial magnetism in a triaxial direction. A GPS control unit 69 receives a signal from a GPS satellite and calculates a current position. The front camera 30 and the rear camera 31 each capture an image and input image data. The front camera 30 and the rear camera 31 are configured with a CMOS image sensor (Complementary Metal Oxide Semiconductor Image Sensor).

In an interface 90, an operation unit 70 includes various operation means provided in the first information processing apparatus 10. More specifically, the operation unit 70 includes the operation buttons 22, the directional keys 23, the analog sticks 24, the L button 26a, the R button 26b, the HOME button 27, the START button 28, the SELECT button 29, the power button 33, the negative button 36a, and the positive button 36b. The front touch pad 21 and the rear touch pad 32 are multi-touch pads, and the front touch pad 21 is arranged being overlaid on the surface of the display apparatus 20. The speakers 25 output a sound created by the functions of the first information processing apparatus 10, and the microphone 39 inputs a sound from around the first information processing apparatus 10. The sound input and output terminal 38 inputs a stereo sound from the external microphone and outputs the stereo sound to an external headphone or the like.

A game card 76 in which a game file is recorded is inserted into the game card slot 34. The game card 76 has a data-writable recording area. When the game card 76 is placed in the game card slot 34, data is written or read by a media drive. A memory card 78 is inserted into the memory card slot 37. The memory card 78, when placed in the memory card slot 37, is used as an external auxiliary storage device. The multi-use terminal 40 can be used as a USB terminal and exchanges data with another USB device when the USB cable 80 is connected to the multi-use terminal 40. To the accessory terminal 35, a peripheral device is connected.

Figure 5:
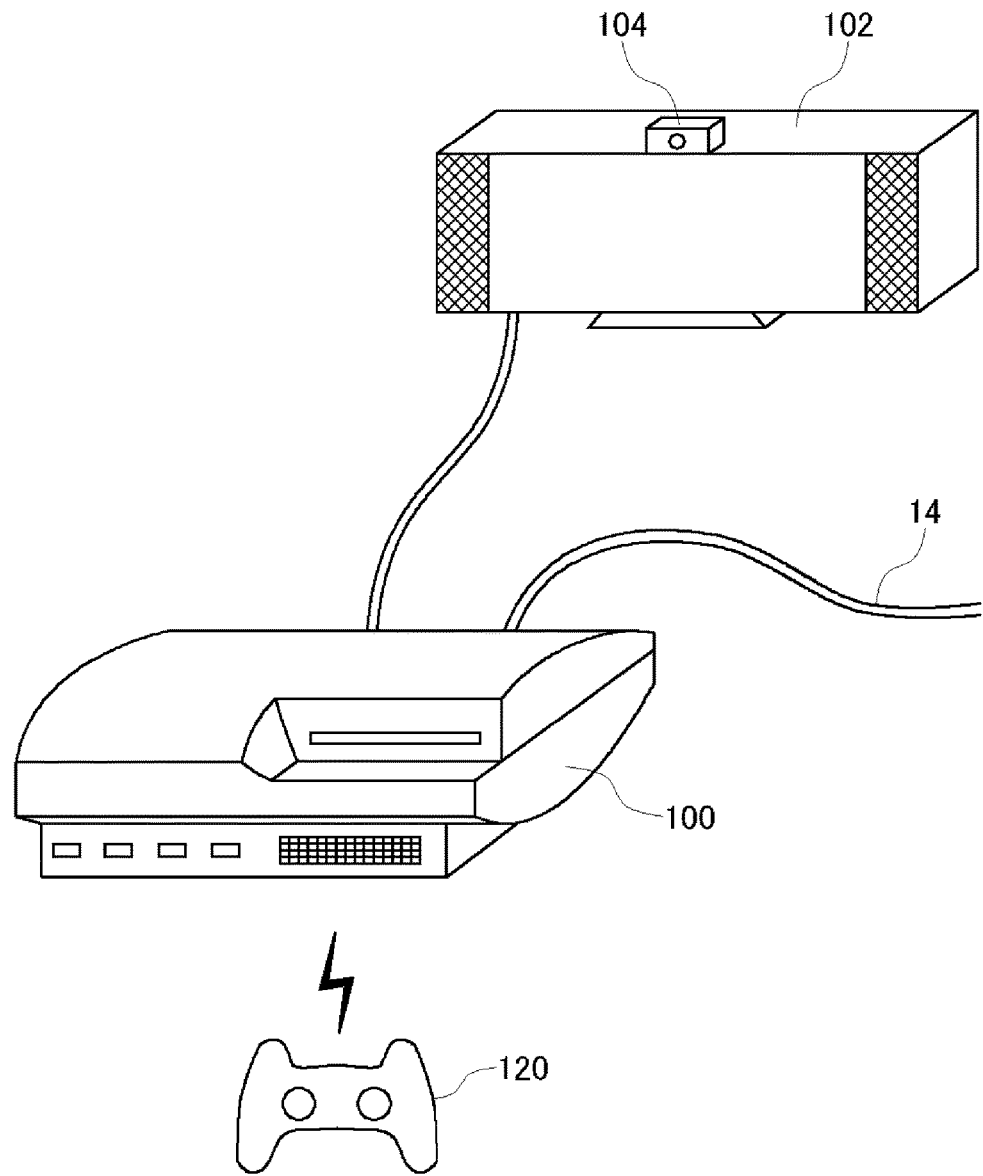
FIG. 5 is a diagram illustrating a usage environment of a second information processing apparatus.

FIG. 5 illustrates a usage environment of a second information processing apparatus 100. A display apparatus 102 may be a TV set having a display for outputting an image and a speaker for outputting a sound or may be a computer display. A camera 104 is provided on the display apparatus 102. When the user turns on the main power of the second information processing apparatus 100, the image of the user captured by the camera 104 is transmitted to the second information processing apparatus 100, and the second information processing apparatus 100 identifies the user by image recognition processing. The second information processing apparatus 100 performs a process of logging in using a local account of the identified user and performs, using a network account, a process of signing in to a network service that is provided by the server 5. The camera 104 is a stereo camera and may allow the second information processing apparatus 100 to measure a distance from a subject. For example, if a plurality of users are captured, the second information processing apparatus 100 may log in and/or sign in using an account of a user near the camera 104.

The display apparatus 102 may be connected to the second information processing apparatus 100 via a wired cable or wirelessly via a wireless LAN (Local Area Network). An input apparatus 120 is a game controller. The user operates the input apparatus 120 and provides operation information to the second information processing apparatus 100 so as to progress a game. The second information processing apparatus 100, the input apparatus 120, and the display apparatus 102 may be formed integrally such that the apparatuses are configured as a mobile terminal apparatus provided with an application processing function. In the information processing system 1, the second information processing apparatus 100 becomes connected to the network 3 via the AP 2 connected to the cable 14.

Figure 6:
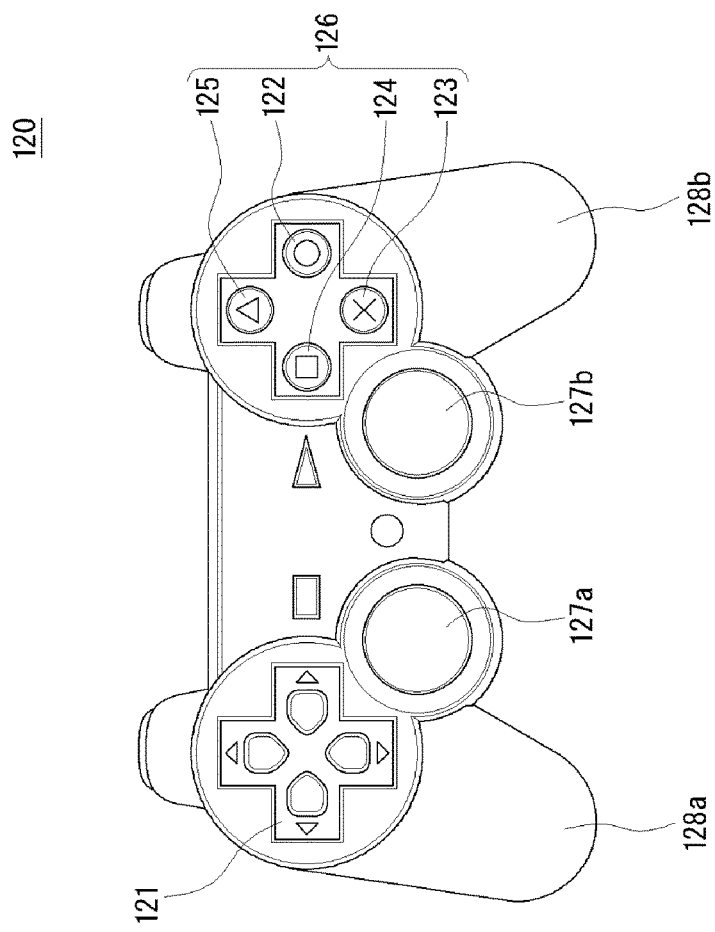
FIG. 6 is a diagram illustrating the exterior configuration of an input apparatus.

FIG. 6 illustrates the exterior configuration of the input apparatus 120. The input apparatus 120 is provided, on the surface of a housing thereof, with directional keys 121, analog sticks 127a and 127b, and four types of operation buttons 126 as operation means operable by the user. The four types of operation buttons 126 comprise a circle-marked button 122, an x-marked button 123, a square-marked button 124, and a triangle-marked button 125. On the rear housing surface of the input apparatus 120, an L1 button 129a and an R1 button 129b are provided on the left side and the right side, respectively. The user holds a left grip 128a with his/her left hand and a right grip 128b with his/her right hand so as to operate each operation means.

The input apparatus 120 has a function of transmitting an operation signal entered by the user to the second information processing apparatus 100. In the present exemplary embodiment, the input apparatus 120 is configured to be capable of communicating wirelessly with the second information processing apparatus 100. The input apparatus 120 and the second information processing apparatus 100 may establish a wireless connection by using Bluetooth (registered trademark) protocol or IEEE 802.11 protocol or the like. The input apparatus 120 may be connected to the second information processing apparatus 100 via a cable so as to transmit an operation signal entered by the user to the second information processing apparatus 100.

Figure 7:
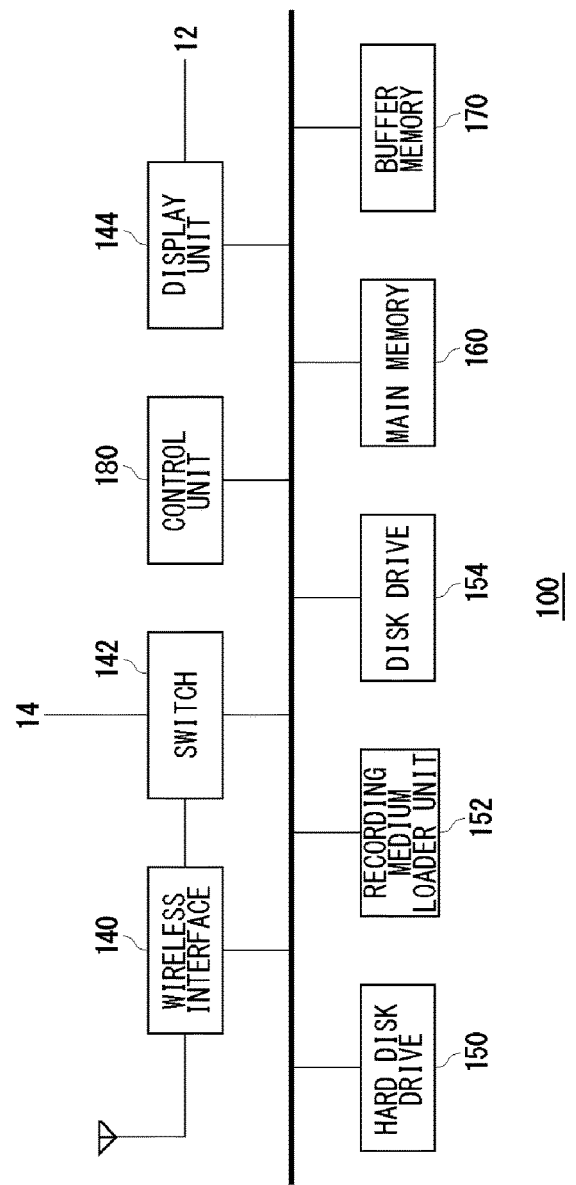
FIG. 7 is a functional block diagram of the second information processing apparatus.

FIG. 7 illustrates a functional block diagram of the second information processing apparatus 100. The second information processing apparatus 100 is provided with a wireless interface 140, a switch 142, a display unit 144, a hard disk drive 150, a recording medium loader unit 152, a disk drive 154, a main memory 160, a buffer memory 170, and a control unit 180. The hard disk drive 150 is an example of a large-capacity memory device, and the memory device may be configured by a flash memory or the like. The display unit 144 has a frame memory for buffering data to be displayed on a display of the display apparatus 102.

The switch 142 is an Ethernet switch (Ethernet is a registered trademark) and a device that is connected to an external device by wire or wirelessly so as to transmit and receive data. The switch 142 is connected to the wireless interface 140, and the wireless interface 140 is connected to the input apparatus 120 through a predetermined wireless communication protocol. The wireless interface 140 may be connected to the AP2 via a wireless LAN. The operation signal entered by the user in the input apparatus 120 is provided to the control unit 180 via the wireless interface 140 and the switch 142.

<Content Downloading Function>

Figure 8:
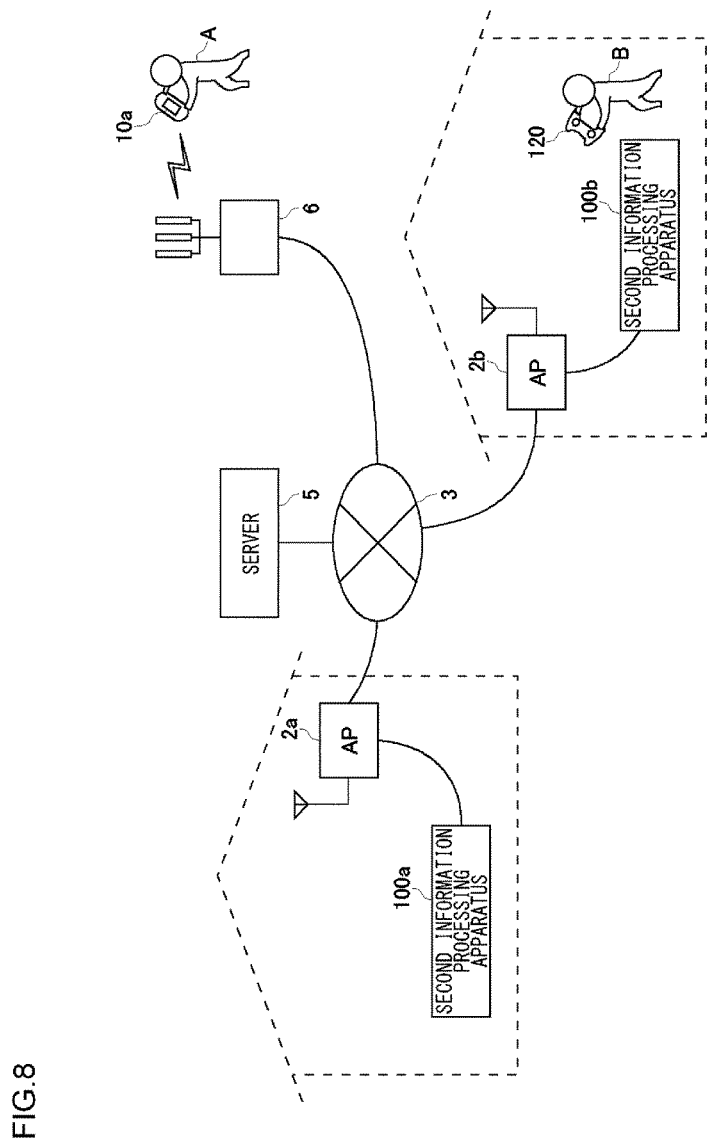
FIG. 8 is a diagram explaining a flow of content downloading in the information processing system.

FIG. 8 is a diagram explaining a flow of content downloading in the information processing system 1. The user A is away from home carrying the first information processing apparatus 10a. The first information processing apparatus 10a of the user A is accessing the second information processing apparatus 100b of the user B who is registered as a friend so as to view a game video image of the game X being played by the user B.

Figure 9:
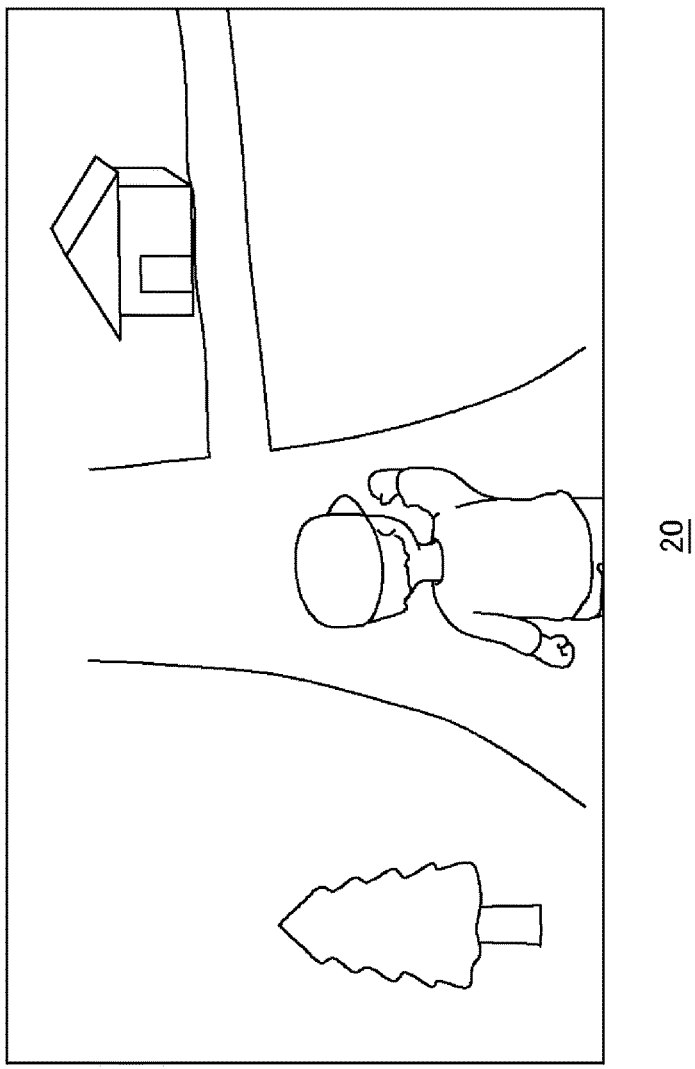
FIG. 9 is a diagram illustrating a content image displayed on a display apparatus of the first information processing apparatus.

FIG. 9 illustrates a content image displayed on the display apparatus 20 of the first information processing apparatus 10. The content image is a live video image of the game X currently being played by the user B. The first information processing apparatus 10a of the user A is connected to the second information processing apparatus 100b of the user B and reproduces a play video image delivered from the second information processing apparatus 100b. The first information processing apparatus 10a acquires the IP address of the second information processing apparatus 100b from the server 5. A content image to be viewed may be a game video image of play that has been played by the user B in the past. The first information processing apparatus 10a may become connected to the server 5 and acquire the activity information of the user B, and the user A may select play motion video from the past included in the activity and reproduces the play motion video. The content image may be a motion video image or may be a still image.

Figure 10:
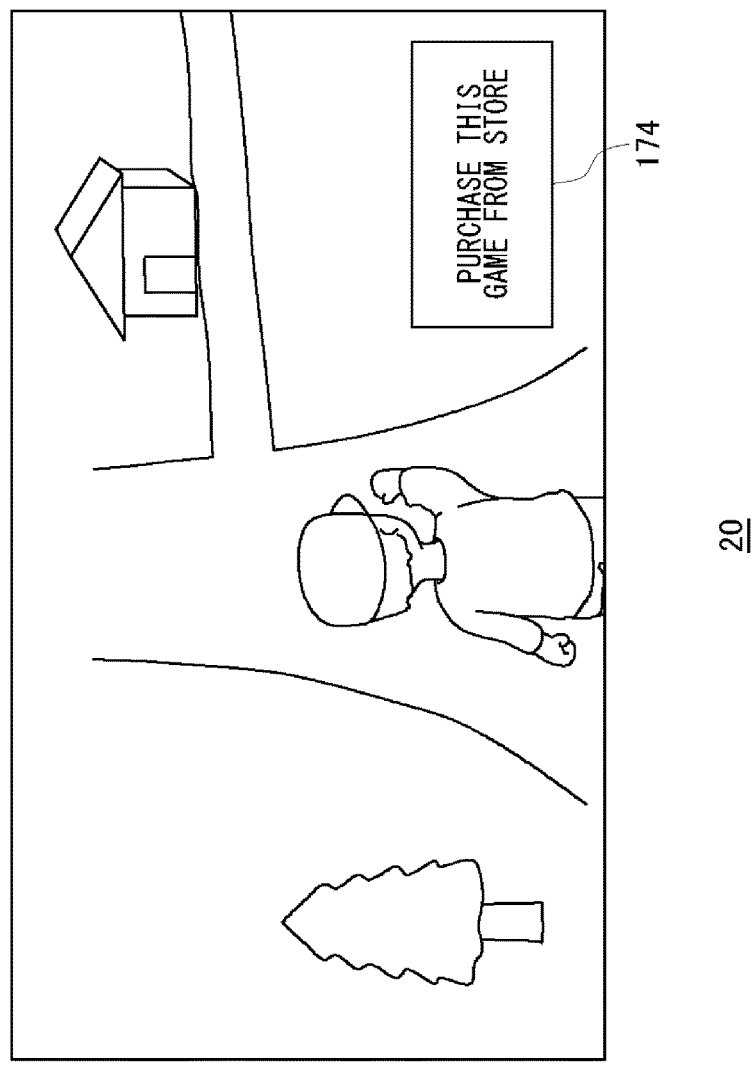
FIG. 10 is a diagram illustrating a link button displayed on the display apparatus.

FIG. 10 illustrates a link button displayed on the display apparatus 20. In the present exemplary embodiment, a link button 174 is displayed as an image for acquiring game software, and more specifically, the link button 174 is a button that allows for access to the server 5. When the user A taps the link button 174, a request for accessing a screen image for acquiring the game software is transmitted to the server 5. The first information processing apparatus 10a becomes connected to the base station 6 by the mobile phone module 72 so as to communicate with the server 5 via the mobile phone network 4 and the network 3. Upon the receipt of the access request, the server 5 generates data for generating a page for acquiring the game software (acquisition page configuration data) and transmits the data to the first information processing apparatus 10a.

Figure 11:
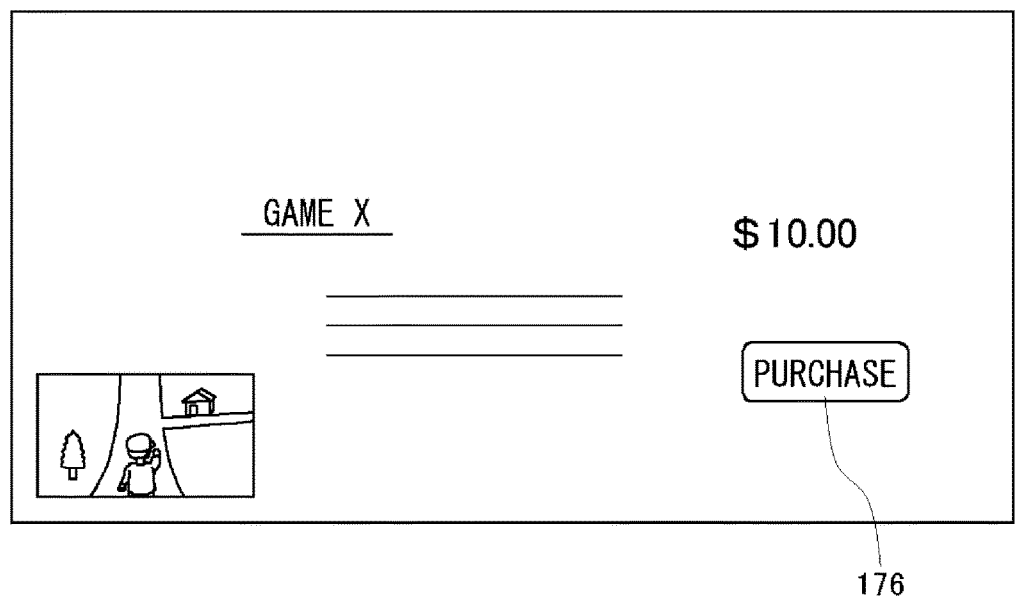
FIG. 11 is a diagram illustrating a content acquisition screen image displayed on the display apparatus.

FIG. 11 illustrates a content acquisition screen image displayed on the display apparatus 20. On the acquisition screen image, a purchase button 176 for purchasing content is set. Just like the link button 174, the purchase button 176 is also an image for acquiring game software. On the content acquisition screen image, a play video image of the user B is displayed, and the user A can take a purchasing action while viewing the play video image. On the acquisition screen image, the play video image of the user B may be switched with play motion video of another user. The user A can purchase the game X while checking what kind of game the game X is.

When the user A selects the purchase button 176, the second information processing apparatus 100a transmits a request for acquiring the content to the server 5. In this example, a request for acquiring the game X is transmitted from the content acquisition screen image to the server 5. Alternatively, a request for acquiring the content may be transmitted to the server 5 when the link button 174 shown in FIG. 10 is selected. In other words, the link button 174 may have a role of the purchase button 176.

Referring back to FIG. 8, upon the receipt of the acquisition request, the server 5 transmits stored content (game software) to the second information processing apparatus 100a. In other words, upon the receipt of the content acquisition request from the first information processing apparatus 10a, the server 5 transmits the content using the second information processing apparatus 100a as a destination. This allows the user A to download content onto the second information processing apparatus 100a located indoors even when the user A is outside.

Figure 12:
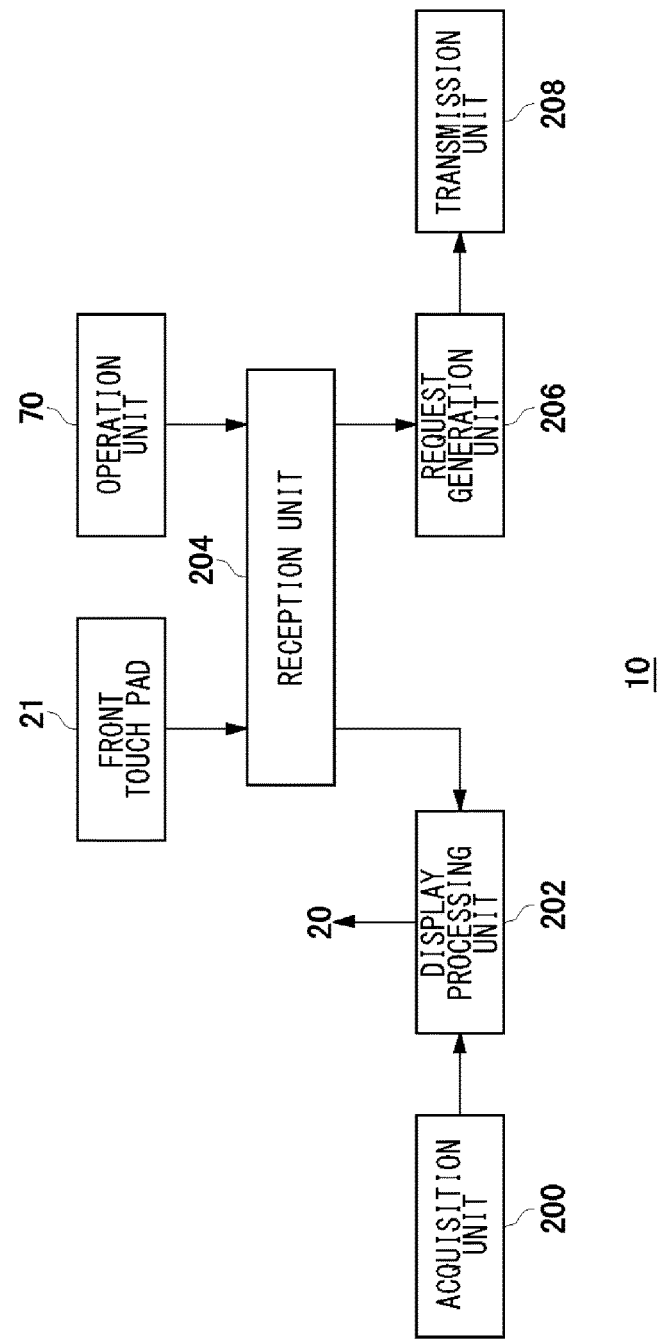
FIG. 12 is a diagram illustrating functional blocks for transmitting a content acquisition request in the first information processing apparatus.

FIG. 12 illustrates functional blocks for transmitting a content acquisition request in the first information processing apparatus 10. The configuration shown in FIG. 12 is implemented in hardware component by any CPU of a computer, a memory or a program loaded into the memory. Functional blocks are implemented by the cooperation of hardware components. Thus, a person skilled in the art should appreciate that there are many ways of accomplishing these functional blocks in various forms in accordance with the components of hardware only, software only, or the combination of both.

An acquisition unit 200 acquires image data in which game play is recorded or image data of a game currently being played from the server 5 or from the second information processing apparatus 100 possessed by another user. As metadata, information (content ID) for identifying the game being played is included in this image data. A display processing unit 202 displays an image of game play on the display apparatus 20 using the acquired image data. As described previously, a game video image to be displayed is a motion video image played in the past or currently being played by a user other than the user A, and the user A does not possess the game X being played. FIG. 9 illustrates play motion video being displayed on the display apparatus 20.

When the user A performs a predetermined operation on the first information processing apparatus 10a, the display processing unit 202 displays an image for acquiring content as shown in FIG. 10. For example, when the user A taps the display apparatus 20 on which the play motion video is being displayed, a reception unit 204 receives information indicating that the play motion video has been selected via the front touch pad 21, and the display processing unit 202 displays the image for acquiring the content. When a predetermined button in the operation unit 70 is operated, the reception unit 204 may receive the information indicating that the play motion video has been selected, and the display processing unit 202 may display the image for acquiring the content. In the present exemplary embodiment, one of images for acquiring content is the link button 174 that allows for access to the server 5 (see FIG. 10). The display processing unit 202 may display the link button 174 not only during the display of a play image but also after the display has ceased.

When the user taps the link button 174, the reception unit 204 recognizes that the link button 174 has been selected, and a request generation unit 206 generates a request for acquiring the content. This request for acquiring the content is a request for accessing an acquisition screen image of game software and includes the content ID of the game software. The request generation unit 206 receives the content ID provided from the acquisition unit 200 and keeps the content ID while the play motion video is being displayed on the display apparatus 20. With this, the request generation unit 206 can include the content ID in an access request. The request generation unit 206 has the address information of the server 5 in the network 3 and generates a packet that includes this address information and the access request. This packet is transmitted to the server 5 from a transmission unit 208.

In FIG. 10, an example is shown where the link button 174 is displayed over play motion video. Alternatively, the link button 174 may be displayed as one of items included in an option menu. For example, as other items, the option menu may include copying, deletion, or the like of a display image. The option menu may be displayed being superimposed on a content image by tapping a predetermined button (not shown) on the screen image.

Figure 13:
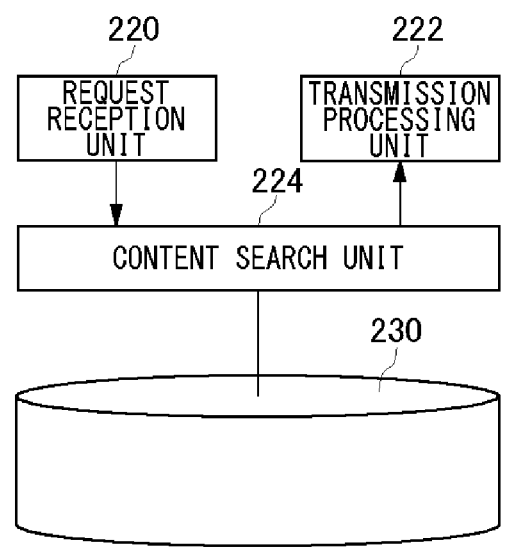
FIG. 13 is a diagram illustrating functional blocks of a server.

FIG. 13 illustrates functional blocks of the server 5. The server 5 is provided with a request reception unit 220, a transmission processing unit 222, a content search unit 224, and a retention unit 230. The retention unit 230 holds a plurality of items of content.

When the request reception unit 220 receives a packet including a content ID from the first information processing apparatus 10a, the content search unit 224 checks whether or not content (game software) identified by the content ID included in the packet exists in the retention unit 230. When the content search unit 224 confirms that the content exists in the retention unit 230, the content search unit 224 generates data for generating a page for acquiring the content (acquisition page configuration data), and the transmission processing unit 222 transmits the data to the first information processing apparatus 10a. In the first information processing apparatus 10a, the display processing unit 202 displays an acquisition screen image on the display apparatus 20 using the acquisition page configuration data (see FIG. 12). On the acquisition screen image, a purchase button 176 for purchasing the content is set, and when the user taps the purchase button 176, the request generation unit 206 generates a request for downloading the content. This request for downloading the content includes a destination of the content to be purchased, and the destination is registered as the second information processing apparatus 100a in the request generation unit 206. The transmission unit 208 transmits the generated request for downloading to the server 5.

In the server 5, the request reception unit 220 receives the request for downloading. This request for downloading includes the destination of the purchased content. When the content search unit 224 reads out a content file identified by the request for downloading from the retention unit 230, the transmission processing unit 222 transmits the content file to the destination (second information processing apparatus 100a) identified by the request for downloading.

The destination of the content may be included in the request for downloading. Alternatively, the destination may be managed in advance by the transmission processing unit 222 in the server 5. The user A may register in advance, in a management database, information indicating that the destination for downloading the content is the second information processing apparatus 100a. Therefore, the destination of the content may not be included in the request for downloading in this case. When the request reception unit 220 receives the request for downloading from the first information processing apparatus 10a, the transmission processing unit 222 extracts the destination mapped to the first information processing apparatus 10a from the management database. Based on the destination, the content file can be transmitted to the second information processing apparatus 100a.

There is a case where the user A is outside, and the main power of the second information processing apparatus 100a is turned off. Thus, the transmission processing unit 222 may transmit an activation instruction to the second information processing apparatus 100a upon the receipt of the request for downloading from the first information processing apparatus 10a. Upon the receipt of the activation instruction from the server 5, the second information processing apparatus 100a automatically turns the main power on so as to become activated and automatically signs in to the server 5. This allows the second information processing apparatus 100a to download the content. The second information processing apparatus 100a may notify the server 5 that the second information processing apparatus 100a is activated and in a downloadable condition at this time. Upon the receipt of this notification, the transmission processing unit 222 may transmit the software of the game X to the second information processing apparatus 100a. Upon the further receipt of a notification indicating that the request for downloading the game X has been issued by the first information processing apparatus 10a after the receipt of the activation instruction from the server 5, the second information processing apparatus 100a may download the software of the game X based on this notification.

The first information processing apparatus 10a may transmit an activation instruction to the second information processing apparatus 100a concurrently when the first information processing apparatus 10a transmits the request for downloading. Upon the receipt of the activation instruction from the first information processing apparatus 10a, the second information processing apparatus 100a automatically turns the main power on so as to become activated and automatically signs in to the server 5. This allows the second information processing apparatus 100a to make preparations for executing download.

Figure 14:
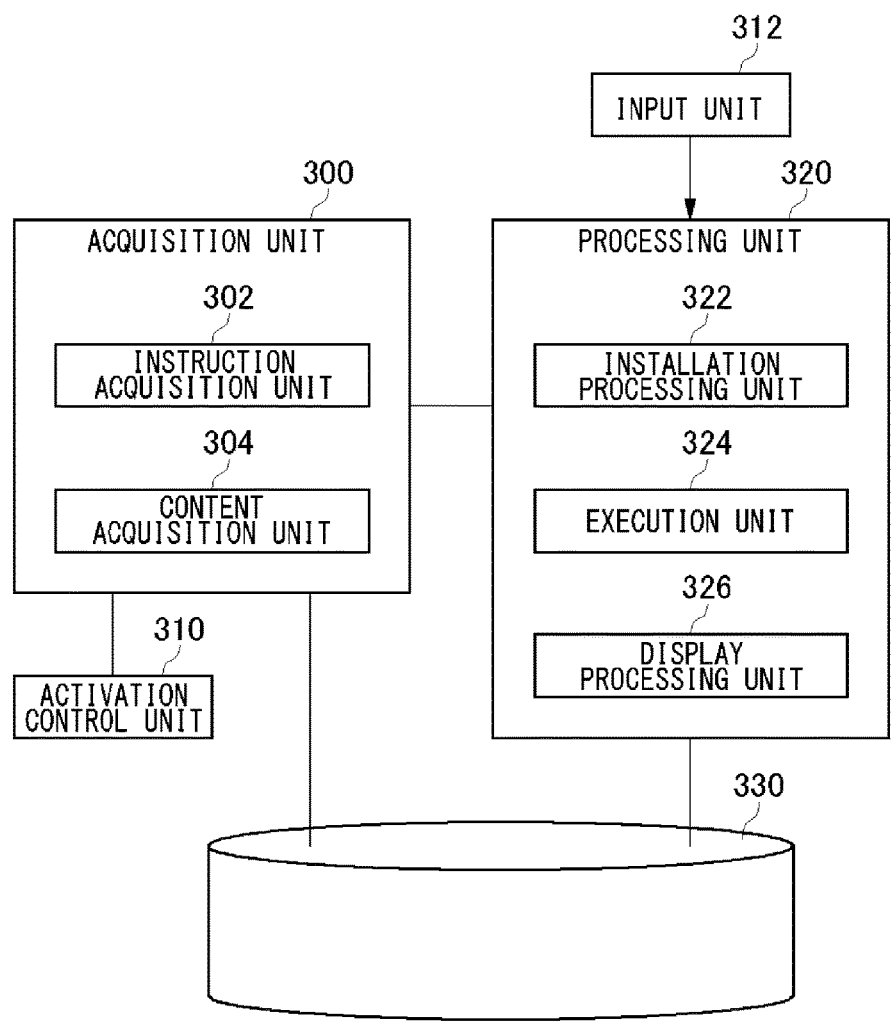
FIG. 14 is a diagram illustrating an example of functional blocks of the second information processing apparatus for downloading and then executing content.

FIG. 14 illustrates an example of functional blocks of a second information processing apparatus 100 for downloading and then executing content. The second information processing apparatus 100 is provided with an acquisition unit 300, an activation control unit 310, an input unit 312, a processing unit 320, and a memory unit 330. The acquisition unit 300 has an instruction acquisition unit 302 and a content acquisition unit 304, and the processing unit 320 has an installation processing unit 322, and execution unit 324, and a display processing unit 326. The memory unit 330 may be a disk drive 154. Alternatively, the memory unit 330 may be configured by other types of memory apparatuses.

The configuration shown in FIG. 14 is implemented in hardware component by any CPU of a computer, a memory or a program loaded into the memory. Functional blocks are implemented by the cooperation of hardware components. Thus, a person skilled in the art should appreciate that there are many ways of accomplishing these functional blocks in various forms in accordance with the components of hardware only, software only, or the combination of both.

During a sleep state where the main power is turned off, a communication function of the second information processing apparatus 100 is active, and the second information processing apparatus 100 can receive an instruction from the server 5 or the input apparatus 120. During the sleep state, the instruction acquisition unit 302 acquires an activation instruction from the server 5 or from the first information processing apparatus 10 of the same user. Upon the receipt of this activation instruction, the activation control unit 310 turns the main power on so as to activate the second information processing apparatus 100, and the second information processing apparatus 100 becomes capable of downloading content.

After the activation of the second information processing apparatus 100a, the content acquisition unit 304 downloads the software of the game X from the server 5 and then stores the software in the memory unit 330. The content acquisition unit 304 may acquire, from the server 5, a stored area (URL: Uniform Resource Locator) and/or a content ID of the game software to be downloaded and then download the game X right away or at a preferred time. When the server 5 confirms that the activation of the second information processing apparatus 100a has been completed after transmitting the activation instruction to the second information processing apparatus 100a, the server 5 may transmit the game software to the second information processing apparatus 100a. In either case, the second information processing apparatus 100a automatically downloads the game X without an operation performed by the user A. With this, a situation can be created where the game X has already been downloaded by the time the user A comes back home. When the content acquisition unit 304 finishes downloading the content, the activation control unit 310 turns the main power off so that the second information processing apparatus 100a transitions into a sleep state. In the information processing system 1, a friend can give a present such as game software to the user A. As in the case of the game X, the second information processing apparatus 100a automatically downloads the present. The downloaded game software is installed in principle according to an instruction from the user. Game software that has been automatically downloaded is not automatically installed.

After coming back home, the user A turns on the main power of the second information processing apparatus 100a so as to activate the second information processing apparatus 100a. The user A brings his/her face closer to the front of the camera 104 at this time, and the second information processing apparatus 100a authenticates the user A based on an image captured by the camera 104. This allows the second information processing apparatus 100a to perform a process of automatic logging in using the local account of the user A and to perform a process of automatic signing in using the network account of the user A. Upon the completion of the log in and sign in by the second information processing apparatus 100a, the display processing unit 326 displays a menu screen image on the display apparatus 102.

Figure 15:
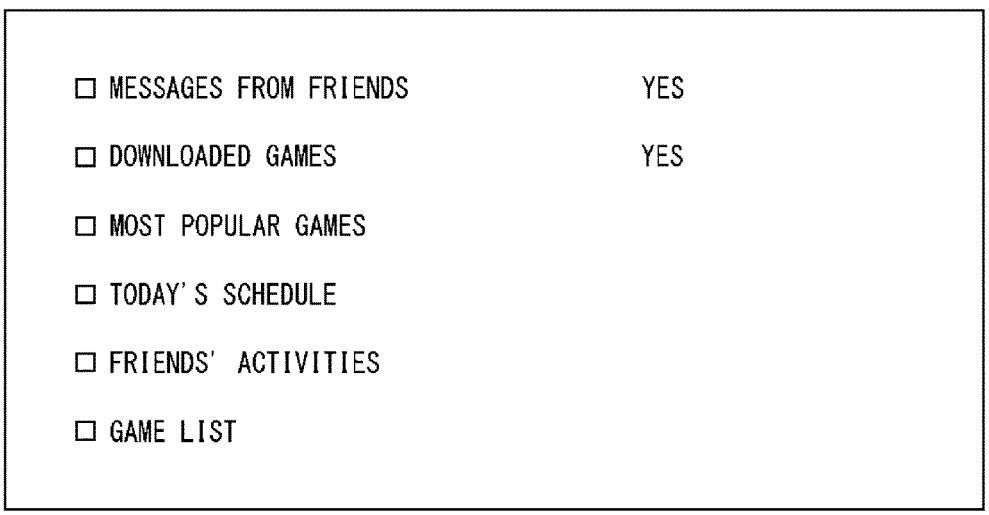
FIG. 15 is a diagram illustrating an example of a menu screen image displayed in the second information processing apparatus.

FIG. 15 is an example of a menu screen image displayed in the second information processing apparatus 100. In the information processing system 1 according to the exemplary embodiment, various types of information is provided from the server 5 to the second information processing apparatus 100a even when the user A is away from home. Various items are arranged on the menu screen image. When the user A selects an item using the input apparatus 120, the input unit 312 receives a selection operation, and the display processing unit 326 displays a detail screen image of the selected item.

Figure 16:
FIG. 16 is a diagram illustrating a list screen image of a downloaded game.

FIG. 16 illustrates a list screen image of a downloaded game. When the user A selects "downloaded games" in FIG. 15, the display processing unit 326 displays the list screen image of the downloaded game on the display apparatus 102. The figure shows an example where the game X is downloaded. However, a game demo that is autonomously provided by the server 5 may be downloaded. Also, game software given by a friend as a present may be downloaded. If the server 5 autonomously provides a game, a comment indicating that the game is recommended by the server 5 may be added to the game. When a friend gives a game as a present, the name of the friend, who is the sender of the present, may be added to the game. When the user selects the game X using the input apparatus 120, the input unit 312 receives a selection operation, and the installation processing unit 322 installs the software of the game X. This allows the user A to play the game X.

As described above, the information processing system 1 allows the second information processing apparatus 100, which is located indoors, to download desired content (game software) even when the user A is outside. This allows the user to enjoy the game immediately after coming back home. For example, the user may specify a desired download completion time in advance in the server 5, and the server 5 may set a time for transmitting content according to the specified time.

As shown in FIG. 15, the second information processing apparatus 100 is provided with various types of information from the server 5. For example, when the user selects an item, "the most popular games," the user can learn which one is the most often played game in the world for each genre. Accessing such information, the user feels tempted to play a new game, and downloads game software from the second information processing apparatus 100.

Realism is pursued in recent game developments, and the user can enjoy a feeling as if the user had the actual experience in the ethos of the game. The pursuit of realism includes details such as the gestures and expressions of game characters and background depictions, and the ethos of the game that closely resembles the actual world is realized. Therefore, the data size of game software has inevitably been increased. Thus, it often takes time to download game software. For the user A who is about to download and play a game, it is a pain to have an extremely long downloading time. Thus, it is preferred that a waiting time for download be reduced so that game software is efficiently downloaded.

Thus, in the information processing system 1, game software can be divided for downloading. An example is shown in the following where, e.g., game software (game Z) whose data size is about several tens of GB is downloaded.

The user selects an item, "the most popular games or "friends' activities," on the menu screen image so as to view the information of a game the user does not possess. For example, a game title being played by a friend may be displayed in the activities, and a link button may be displayed next to the game title that is not possessed by the user. When the user performs an operation of selecting the link button using the display apparatus 20 when purchasing the game Z after viewing the information of the game Z, information indicating that the operation has be performed is transmitted to the server 5, and the server 5 transmits the acquisition page configuration data of the game z to the second information processing apparatus 100. The display processing unit 326 generates a purchase screen image of the game Z based on the acquisition page configuration data and displays the purchase screen image on the display apparatus 102. The purchase screen image of a game may be a screen image such as the one shown in FIG. 11 or may be a different screen image. When the user selects a purchase button, a request for acquiring the game Z is transmitted to the server 5, and the server 5 transmits the software of the game Z to the second information processing apparatus 100.

The game Z is composed of a plurality of stages. For example, a first stage through a 100th stage have been prepared. In conventional game installation, the game Z of a full size is first downloaded in its entirety, and installation processing is then performed in a hard disk drive 150. Thus, a download time becomes long if the entire size is about several tens of GB. Thus, the server 5 divides the game software into at least two parts and stores the divided game software in advance.

In reference to FIG. 13, the retention unit 230 stores the game software as both a first file for executing a part of the game and a second file for executing the entire game. The part of the game contains at least the first stage of the hundred stages and may contain a plurality of stages to be played in the order starting from the first stage. The entire game means all the hundred stages.

The game software contains both a program itself for progressing the game and data used by the program. The first file comprises both the program itself necessary for playing the first stage and data used for the first stage. In other words, the second information processing apparatus 100 can execute at least the first stage of the game Z by downloading and installing the first file.

When the request reception unit 220 receives a request for downloading the game software in the server 5, the content search unit 224 reads out the game software from the retention unit 230, and the transmission processing unit 222 transmits the game software to the second information processing apparatus 100. The transmission processing unit 222 first transmits the first file and then transmits the second file after completing the transmission of the first file. The number of division of the game software is not limited to two. The game software may be divided into three or more. When transmitting the game software to the second information processing apparatus 100, the transmission processing unit 222 notifies the second information processing apparatus 100 that the game software is divided into a plurality of files (in this case, the first and second files) and transmitted. The first file to be transmitted first is a file that allows a part of the game to be executed by installing at least the first file. After transmitting this notification information, the transmission processing unit 222 starts transmitting the first file.

After acquiring the notification information, the content acquisition unit 304 downloads the first file. When the content acquisition unit 304 finishes downloading the first file, the content acquisition unit 304 determines based on the notification information that a part of the game software that can be installed has been acquired and instructs the installation processing unit 322 that installation can be performed. The notification information contains information for identifying a file that allows the game to be started when the file is downloaded from the server 5 and installed. In this case, an example is simply shown where the game can be started once the first file is downloaded and installed. The first file may be composed of a plurality of files. Upon the receipt of the instruction, the installation processing unit 322 automatically installs the first file. Upon the completion of the installation performed by the installation processing unit 322, the display processing unit 326 displays a list of installed games on the display apparatus 102.

Figure 17:
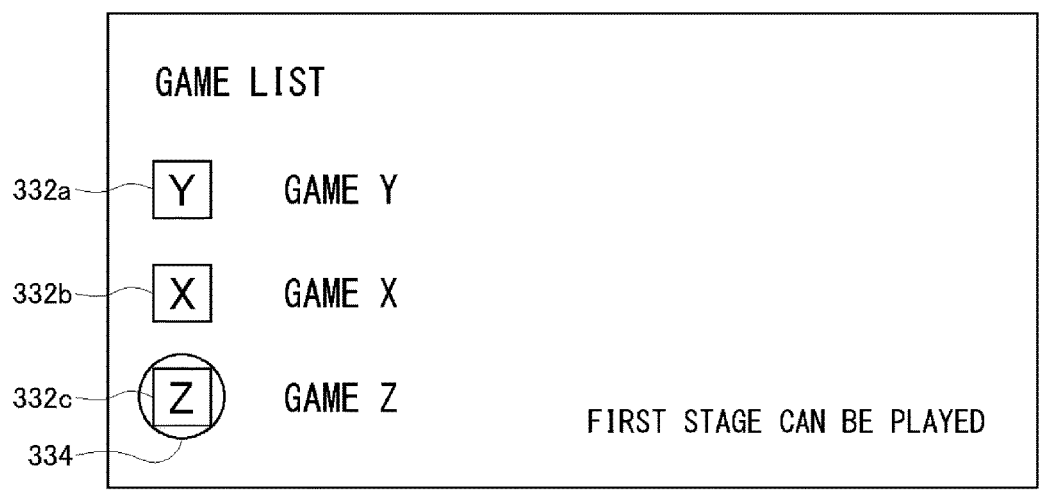
FIG. 17 is a diagram illustrating a list of games that can be played.

FIG. 17 illustrates a list of games that can be played. The list of games shows downloaded games. Games that can be played are those that have been downloaded and then installed. The example shows the title of the game Y, an icon image 332*a* thereof, the title of the game X, an icon image 332*b* thereof, the title of the game Z, and an icon image 332*c* thereof. In this example, a restriction mark 334 is added to the icon image 332*c*, and a message indicating that a first stage can be played is displayed next to the title of the game Z.

When displaying an icon image of the game software, the display processing unit 326 changes a display mode of the icon image 332 differently when the game software has been downloaded in its entirety and when the game software has not been downloaded in its entirety. More specifically, the display processing unit 326 changes the display mode of the icon image 332 differently when the game software is installed in its entirety and when a part of the game software is installed. In this example, the display mode is changed depending on whether or not the restriction mark 334 is to be added. Normally, the game software is to be installed in its entirety and executed. However, in the information processing system 1, the game can be played once a part of the game software has been installed, in order to reduce the waiting time for download. Therefore, it is preferred to notify the user that a full installation of the game software has not been completed. In FIG. 17, the display processing unit 326 adds the restriction mark 334 to the icon image 332*c* and gives a notification to the user by adding a message indicating that the number of stages is limited. As described, by changing the display mode of the icon image 332c, the user can learn that the full installation has not been completed.

When the user selects the icon image 332c using the input apparatus 120, the input unit 312 receives a selection operation, and the execution unit 324 executes the game Z. As described, in the information processing system 1, when the content acquisition unit 304 acquires a part of full-size application software, the installation processing unit 322 automatically installs the acquired part, and the execution unit 324 sets the installed application software to be executable.

The server 5 continues to transmit a second file to the second information processing apparatus 100 while the execution unit 324 is executing the application software, and the content acquisition unit 304 continues to download the application software. This download process is performed in the background, and the user does not have to be aware that the download is going on. The content acquisition unit 304 notifies the display processing unit 326 of a download status from point to point, and the display processing unit 326 may display a progressive bar that indicates the download status in an area that does not interfere with the progress of the game. When the content acquisition unit 304 finishes downloading the second file, the display processing unit 326 is preferably notifies the user that the full download has been completed.

An explanation is now given on a relationship between the first file and the second file. The first file contains both a program itself that allows at least a first stage of the game to be executed and data. In order to simplify the explanation in the following, it is assumed that the first file is a file for executing the first stage and that the second file is a file for executing at least the rest of stages.

As one aspect, the second file may be a file for executing all the stages of the game Z. In other words, there is a relationship where the second file is game software for executing all the stages from the first stage through the 100th stage and the first file is game software for executing only the first stage. In this aspect, since it takes time to download the second file, a purpose is to allow the first file to be downloaded before the second file so that the first stage can be promptly played. In this case, when the download of the second file finishes while the user is playing the first stage, the user once saves the game and installs the second file by the installation processing unit 322. A storage area for save data due to the first file and a storage area for save data due to the second file are set as the same area in the memory unit 330 at this time. Installation data of the first file is uninstalled from the memory unit 330. Since the save data area is the same for the first file and the second file, the save data is automatically passed to installation data of the second file. The user can play the game Z by activating the game software of the second file once again. Even after the downloading of the second file is finished, the execution unit 324 may be able to continue to execute the game software of the first file without finishing the game software, and the installation processing unit 322 may be able to automatically install the second file during the execution of the game software of the first file. After the installation of the second file, the execution unit 324 may be able to once save the game being executed and display a message prompting to restart the game software of the second file. When the user follows the prompting, the installation processing unit 322 may uninstall the first file, and the execution unit 324 may start the game software of the second file.

As another aspect, the second file may be a file for executing the rest of the stages of the game Z (i.e., the second stage through the 100th stage). The second file comprises both a program itself necessary in the second stage through the 100th stage and data. The second file is designated as a patch file for the first file, and the software of the game Z can be installed in its entirety by applying the second file to the first file. In this case, when the download of the second file finishes while the user is playing the first stage, the user once saves the game and performs patch processing on the second file by the installation processing unit 322. The user can play the game Z by activating the game software one again.

As yet another aspect, the second file does not contain a program. The second file comprises image data, audio data, texture, and the like of the second stage and the subsequent stages. A file may be prepared for each stage. Alternatively, a plurality of stages may be put together for a file at this time. When the content acquisition unit 304 downloads a file, the installation processing unit 322 starts storing the file in a predetermined directory. The installation processing unit 322 manages an executable stage and notifies the game executed by the execution unit 324 of the information on the stage. More specifically, when the installation processing unit 322 installs the first file, the installation processing unit 322 notifies the execution unit 324 that the first stage can be executed, and the game therefore takes control so that stages other than the first stage cannot be played. When the content acquisition unit 304 acquires a file for executing the second stage, and when the installation processing unit 322 stores the file in the predetermined directory, the installation processing unit 322 notifies the execution unit 324 that the second stage can be executed. With this, the game takes control so that the first stage and the second stage can be executed, preventing the user from playing stages other than these stages. As described, the installation processing unit 322 starts storing a file of the game software one by one and notifies the game of a stage that becomes executable so that the game takes control so as to allow the user to select and play an executable stage.

When there already exists additional data and when whether or not data is to be used is determined based on the presence of key data, the game may make an inquiry to the system software regarding whether the key data is present and may use the additional data if the key data is present.

As described, when a full installation of the game Z is completed, the display processing unit 326 indicates that the full installation has been done by removing the restriction mark 334 from the icon image 332c shown in FIG. 17. As described, the display processing unit 326 may indicate using the restriction mark 334 whether the full installation has been done or not. Alternatively, the display processing unit 326 may indicate the completion of the full installation by changing the display mode of the icon image 332c. For example, if the full installation has not been done, by displaying the icon image 332c in a small size or in a light manner, a distinction may be made by the user from an icon image of a game for which a full installation has been done.

The download processing is explained in the above. The processing of dividing the game software into a plurality of files and then transmitting the files by the server 5 may be limited to a case when a request for downloading is made by the second information processing apparatus 100. In other words, when the source of the request for downloading is the same as the destination of the game software, the server 5 transmits the first file and the second file in said order. On the other hand, if the source (the first information processing apparatus 10) of the request for downloading and the destination (second information processing apparatus 100) are different, the server 5 does not need to transmit the game software after dividing the game software. In this case, since the user does not play the game Z immediately, it is not necessary to be conscious about the user's waiting time, and the server 5 may allow for a full installation of the game software. As described, when a source of a request for downloading is different from a download destination, it is preferred that the transmission processing unit 222 transmit game software without dividing the game software in the server 5.

<Game Play Participation Function>

An explanation is given of a function of participating another user's play in the following. As described previously, the information processing system 1 provides the user with two participation modes. One mode is remote play where the user joins play of another user even when the user does not possess the game, and another mode is multiplayer play where the user starts the game using the second information processing apparatus 100 and enjoys playing the game together with another user.

Figure 18:
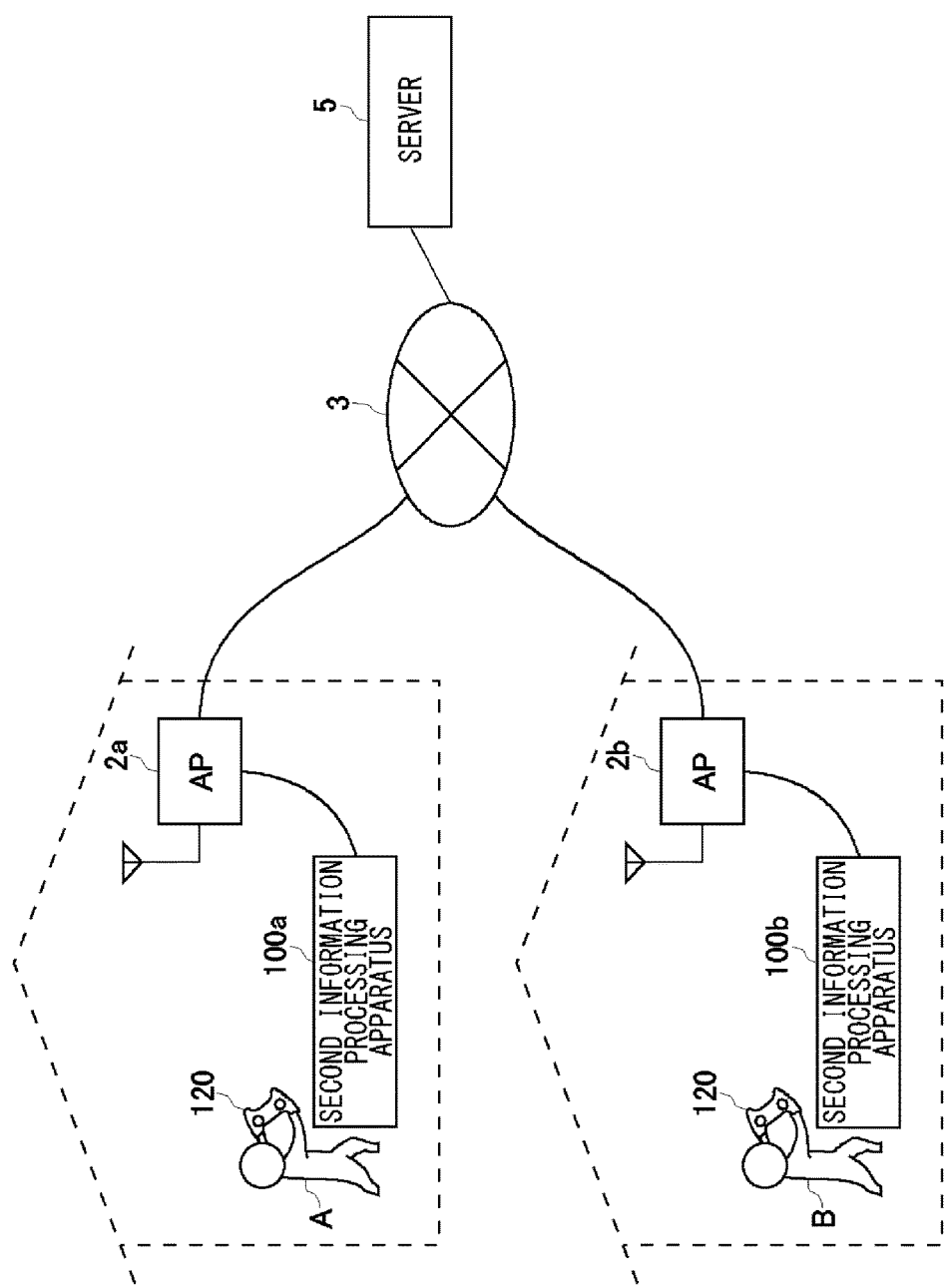
FIG. 18 is a diagram explaining a participation function of the user in the information processing system.

FIG. 18 is a diagram explaining a user's participation function in the information processing system 1. The user B is playing a car racing game, and, through the display apparatus 102 connected to the second information processing apparatus 100a, the user A is watching a game video image of play being played by the user B using the second information processing apparatus 100b. The user B is registered as a friend of the user A. The second information processing apparatus 100a of the user A acquires an IP address of the second information processing apparatus 100b of the user B from the server 5 so as to become connected to the second information processing apparatus 100b. Hereinafter, the display apparatus 102 of the user A is referred to as a display apparatus 102a, and the display apparatus 102 of the user B is referred to as a display apparatus 102b.

Figure 19:
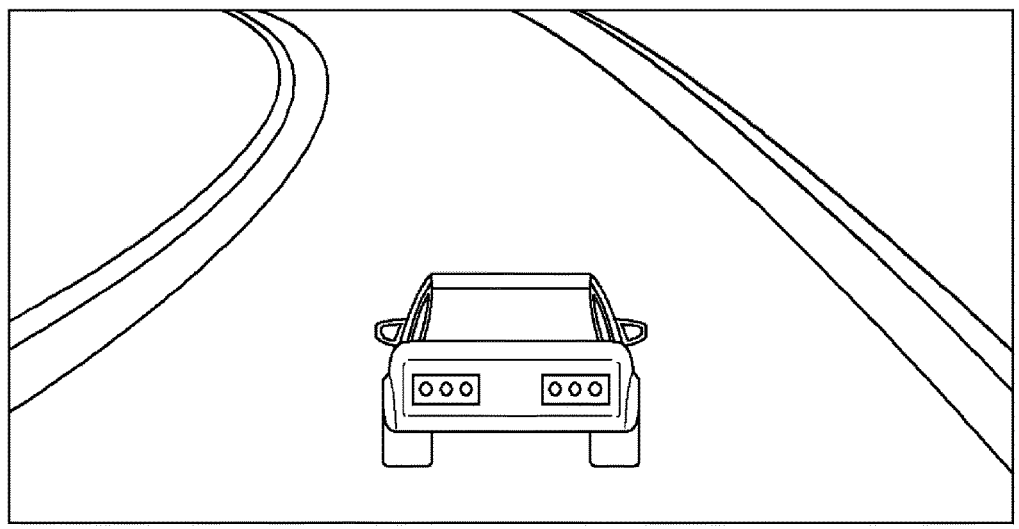
FIG. 19 is a diagram illustrating a game video image that is output to a display apparatus from a second information processing apparatus of a user B.

FIG. 19 illustrates a game video image that is output to the display apparatus 102b from the second information processing apparatus 100b of the user B. When the second information processing apparatus 100a of the user A is receiving delivery of a game video image by streaming from the second information processing apparatus 100b, an icon of the user A may be displayed on the display apparatus 102b of the user B, and the second information processing apparatus 100b may notify the user B that the user A is watching the game video image. The second information processing apparatus 100b of the user B generates image data with image resolution made lower than that of the actual play video image and transmits the image data to the second information processing apparatus 100a. If the speed of a communication line is high, image data whose image resolution is the same as that of the actual play video image may be transmitted.

Figure 20:
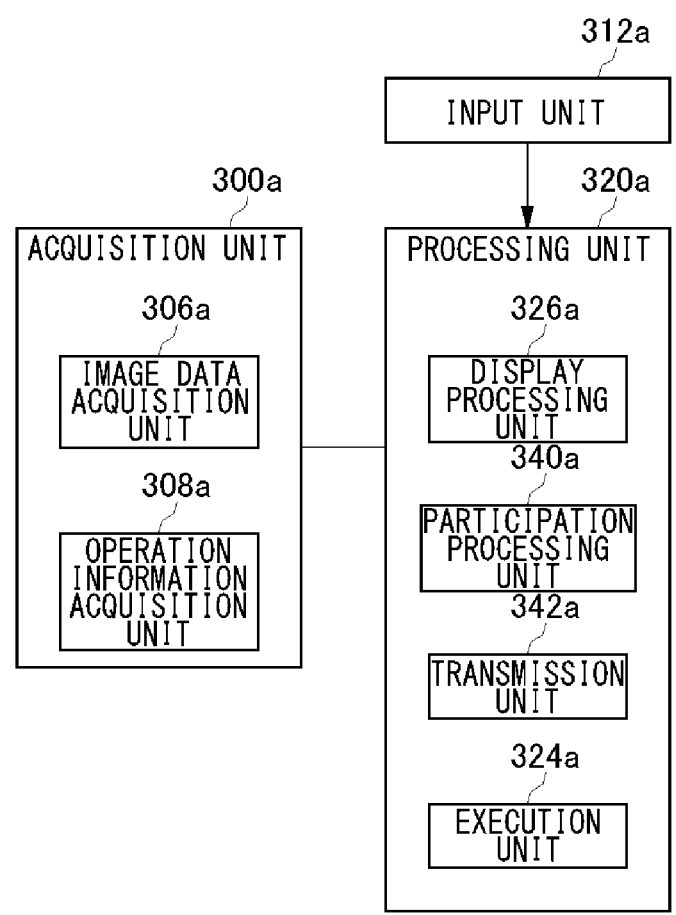
FIG. 20 is a diagram illustrating functional blocks of a second information processing apparatus of a user A.

FIG. 20 illustrates functional blocks of the second information processing apparatus 100a of the user A. The second information processing apparatus 100a is provided with an acquisition unit 300a, an input unit 312a, and a processing unit 320a. The acquisition unit 300a has an image data acquisition unit 306a and an operation information acquisition unit 308a, and the processing unit 320a has a display processing unit 326a, a participation processing unit 340a, a transmission unit 342a, and an execution unit 324a.

Figure 21:
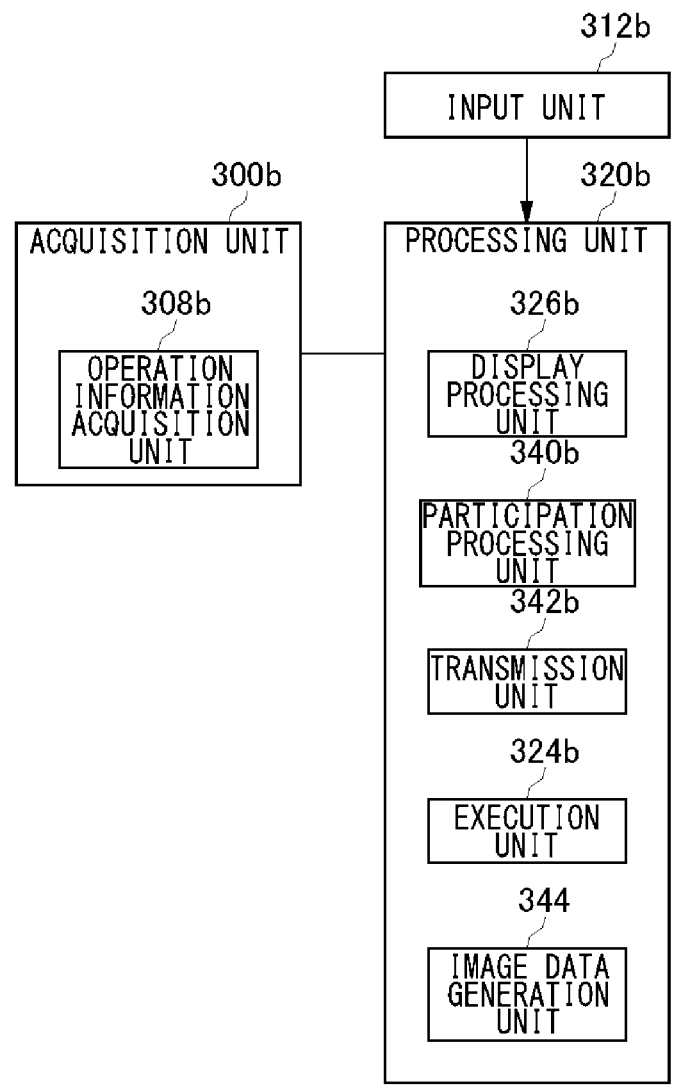
FIG. 21 is a diagram illustrating functional blocks of the second information processing apparatus of the user B.

FIG. 21 illustrates functional blocks of the second information processing apparatus 100b of the user B. The second information processing apparatus 100b is provided with an acquisition unit 300b, an input unit 312b, and a processing unit 320b. The acquisition unit 300b has an operation information acquisition unit 308b, and the processing unit 320b has a display processing unit 326b, a participation processing unit 340b, a transmission unit 342b, an execution unit 324b, and an image data generation unit 344.

Components shown in FIG. 20 and FIG. 21 are implemented in hardware component by any CPU of a computer, a memory or a program loaded into the memory. Functional blocks are implemented by the cooperation of hardware components. Thus, a person skilled in the art should appreciate that there are many ways of accomplishing these functional blocks in various forms in accordance with the components of hardware only, software only, or the combination of both. Thus, a person skilled in the art should appreciate that there are many ways of accomplishing these functional blocks in various forms in accordance with the components of hardware only, software only, or the combination of both.

The respective components shown in FIG. 20 and FIG. 21 correspond to components necessary for a second information processing apparatus 100a of a participant user and to components necessary for a second information processing apparatus 100b of a host user accepting the participation, respectively. Therefore, in reality, a single second information processing apparatus 100 has the both components and functions shown in FIGS. 20 and 21. In this specification, these components are separately described merely for the sake of ease of explanation. The second information processing apparatus 100 has the components shown in FIG. 14, as described previously. Of the components shown in FIGS. 14, 20, and 21, components specified by the same reference numerals after removing the alphabets (a or b) represent the same or similar components.

In the second information processing apparatus 100b shown in FIG. 21, the execution unit 324b executes the car racing game in accordance with operation information entered to the input apparatus 120 by the user B. The execution unit 324b generates a game video image, and the display processing unit 326b displays the game video image on the display apparatus 102b. FIG. 19 illustrates an example of this game video image.

During the game play of the user B, the second information processing apparatus 100a of the user A accesses the second information processing apparatus 100b of the user B so as to receive delivery of a game video image from the second information processing apparatus 100b. In the second information processing apparatus 100b, the image data generation unit 344 generates image data for distribution from the game video image at this time. The game video image that is output by the display processing unit 326b to the display apparatus 102b is generated in accordance with the display apparatus 102b of the user B. Therefore, it is considered difficult for the second information processing apparatus 100a to display the game video image in real time, since the amount of data of the game video image that is transmitted to the second information processing apparatus 100a without any change via the network 3 is large. Thus, the image data generation unit 344 generates image data of a reduced size, and the transmission unit 342b transmits the image data to the second information processing apparatus 100a.

In the second information processing apparatus 100a, the image data acquisition unit 306a acquires image data of game play of the user B, and the display processing unit 326a displays play motion image on the display apparatus 102a in real time. With this, the user A can view the game play of the user B in real time.

Figure 22:
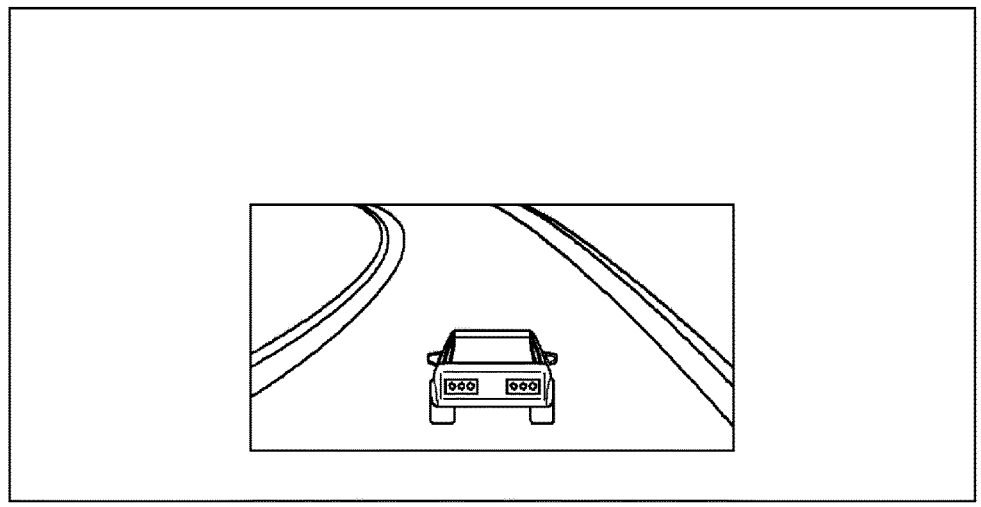
FIG. 22 is a diagram illustrating a game video image that is output to a display apparatus from the second information processing apparatus of the user A.

FIG. 22 illustrates a game video image that is output to the display apparatus 102a from the second information processing apparatus 100a of the user A. The display processing unit 326a displays the play video image of the user B in a part of an area on the display apparatus 102a. The figure shows an example where the play video image is being displayed in the center. Alternatively, the play video image may be displayed on the left edge or on the right edge on the display surface. For example, in a case where the user is executing another application while watching the play video image of the user B, it is preferred that an execution screen image of the application be displayed in the center and that the play video image of the user B be displayed at the corner of the display.

The user A can transmit a participation request to the user B by operating the input apparatus 120 while watching the play video image of the user B on the display apparatus 102a. For example, the participation processing unit 340a may transmit a participation request to the second information processing apparatus 100b of the user B when an area in which the play video image is being displayed is selected on the display apparatus 102a. When the user B allows the participation of the user A in the second information processing apparatus 100b, the participation processing unit 340b transmits a session ID for game play back to the second information processing apparatus 100a. When the participation processing unit 340a acquires the session ID in the second information processing apparatus 100a, the user A can join the game play of the user B.

The session ID may be generated by the server 5. When the participation processing unit 340b generates an instruction for creating a session and the transmission unit 342b then transmits the instruction to the server 5, the server 5 creates a session in accordance with the instruction for creating a session and transmits a session ID. This allows for management of a session for remote play and multiplayer play in the information processing system 1. An example is shown in the following where the second information processing apparatus 100a and the second information processing apparatus 100b transmit and/or receive data directly using a session ID. As described previously, data may be transmitted and/or received via the server 5.

Described above is a case where the user A transmits a participation request. Alternatively, the user B may invite the user A to game play. In the second information processing apparatus 100b, the participation processing unit 340b creates an invitation, and the transmission unit 342b transmits the invitation to the second information processing apparatus 100a. In the second information processing apparatus 100a, the display processing unit 326a displays on the display apparatus 102a a message indicating that there has been an invitation from the user B. When the user A checks the message and wishes to join the game play, the participation processing unit 340a generates a participation request accepting the participation, and the transmission unit 342a transmits the participation request to the second information processing apparatus 100b. In response to this, the transmission unit 342b transmits a session ID for game play back to the second information processing apparatus 100a in the second information processing apparatus 100b. As described, regarding the participation of the user A, a procedure concerning the participation can be subjectively performed by either one of the user A or the user B.

Described above is an example where the second information processing apparatus 100b serves as a host so as to perform a participation procedure of the user A. Alternatively, the server 5 may serve as a host to perform the participation procedure of the user A. Also, it is explained that a live video image of the user B is directly delivered from the second information processing apparatus 100b to the second information processing apparatus 100a. Alternatively, the live video image may be delivered from the second information processing apparatus 100b to the second information processing apparatus 100a via the server 5. Regarding a procedure for participation and a method for distributing video images, techniques that are already publicly known need to be used. In the following, remote play and multiplayer play are explained on the premise that the participation processing unit 340a of the second information processing apparatus 100a has allowed the user A to join a game being played on a second information processing apparatus 100.

In remote play, the user A does not possess car racing game software. In remote play, operation information entered by the user A to the input apparatus 120 is transmitted to the second information processing apparatus 100b of the user B, and the second information processing apparatus 100b reflects the operation information from the user A in the processing of the game and transmits a game image, in which the operation information is reflected, to the second information processing apparatus 100a so that the game image is output from the display apparatus 102a.

When the user A operates the input apparatus 120, operation information received by the input unit 312a is transmitted as a packet to the second information processing apparatus 100b from the transmission unit 342a along with the user A's network account and session ID. In the second information processing apparatus 100b, the execution unit 324b identifies that the operation information has been transmitted from the user A based on the user A's network account included in the packet and identifies that the operation information is that of a car racing game based on the session ID included in the packet. With this, the execution unit 324b progresses the game in accordance with the operation information from the user A. In other words, the execution unit 324b needs to perform processing of the game on the assumption that a player, i.e., the user A, has been added in the second information processing apparatus 100b. The execution unit 324b progresses the game in accordance with operation information from the user A and operation information from the user B. The image data generation unit 344 generates image data for the second information processing apparatus 100a of the user A, and the transmission unit 342b transmits the image data to the second information processing apparatus 100a. With this, the operation information from the user A is reflected in the progress of the game in the image data transmitted from the transmission unit 342b.

In the second information processing apparatus 100a, the image data acquisition unit 306a acquires the image data, and the display processing unit 326a displays, using the image data, the image of game play in which the operation information from the user A has been reflected. As described, remote play allows the user A to play the car racing game even when the car racing game software is not installed in the second information processing apparatus 100a of the user A.

In the remote play, a play video image of the same scene may be displayed on the display apparatus 102a and the display apparatus 102b. As described previously, the resolution of image data displayed on the display apparatus 102*a* is lower than that of image data displayed on the display apparatus 102*b*.

Figure 23:
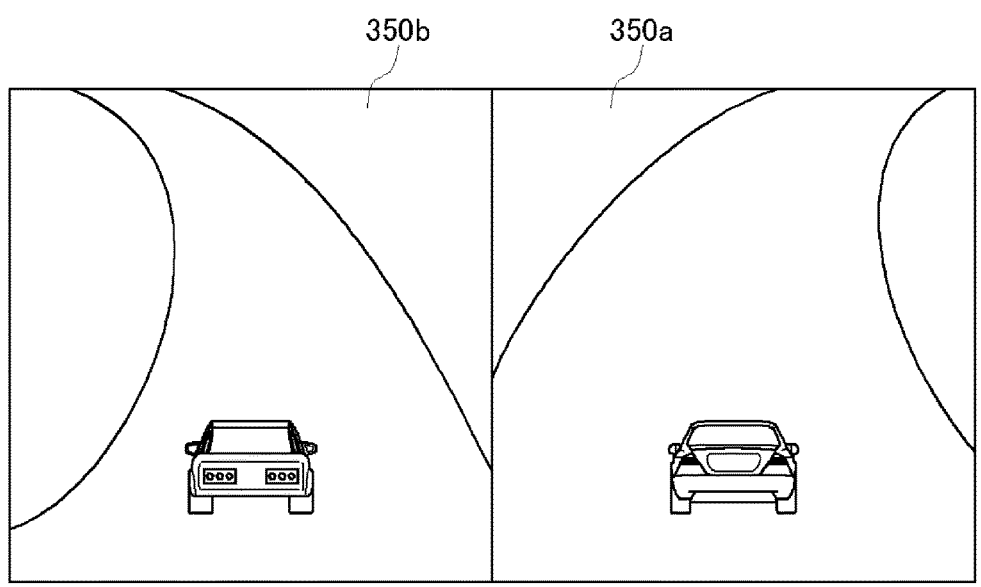
FIG. 23 is a diagram illustrating a game image displayed on a display apparatus of the user A and on a display apparatus of the user B.

FIG. 23 shows a game image displayed on the display apparatus 102*a* of the user A and on the display apparatus 102*b* of the user B. Although the resolution is different, a game image expressing the same scene may be displayed in real time on the display apparatus 102*a* and on the display apparatus 102*b*. The game image shown in FIG. 23 is separated into a game image 350*a* in which operation information from the user A is directly reflected and a game image 350*b* in which operation information from the user B is directly reflected, and displayed. Operation information from the user B may be indirectly reflected in the game image 350*a*. Similarly, operation information from the user A may be indirectly reflected in the game image 350*b*.

The game image 350*a* may be displayed on the display apparatus 102*a*, and the game image 350*b* may be displayed on the display apparatus 102*b*. In this case, in the second information processing apparatus 100*b*, the execution unit 324*b* generates a game image for the user A and a game image for the user B, the display processing unit 326*b* displays the game image for the user B on the display apparatus 102*b*, the image data generation unit 344 generates image data with a lowered resolution from the game image for the user A, and the transmission unit 342*b* transmits the image data to the second information processing apparatus 100*a*; in the second information processing apparatus 100*a*, the display processing unit 326*a* displays the game image for the user A on the display apparatus 102*a*. In this manner, each user can view only a game image of his/her own. When a user wishes to view a game image of another user as shown in FIG. 23, the user can switch the screen image by pressing a display switch button of his/her input apparatus 120.

In the above-described example, an example is shown where the user A and the user B play the car racing game against each other. Different from such a participation format, the participation processing unit 340*a* can allow the user A to join the game instead of the user B. For example, there is a case where the user B puts the user A in charge of operating a player character of the user B when there is an enemy character which the user B cannot defeat by any means in a fighting game. In this case, in the second information processing apparatus 100*b*, the participation processing unit 340*b* creates an invitation asking whether it is possible to play the game instead of the user B, the transmission unit 342*b* then transmits the invitation to the second information processing apparatus 100*a*, and the participation processing unit 340*a* indicates that the user A can join when the user A accepts the invitation. By a predetermined operation performed by the user B on the input apparatus 120, the execution unit 324*b* performs processing of switching the player and executes the game software using operation information from the user A instead of operation information from the user B. By performing a predetermined operation on the input apparatus 120, the user B can switch the player back to the user B from the user A.

When the user B searches for a substitute player, the participation processing unit 340*b* may generate a request (referred to as a switch request) for searching for a user who will take over the game play for the user B, and the transmission unit 342*b* may transmits the request to the server 5. (The following example is based on the assumption that the user A and the user B are not friends. However, even when the two are friends, there will be no problem.) The server 5 manages such switch request. For example, when the participation processing unit 340*a* of the user A acquires a list of switch requests from the server 5 based on an instruction from the user A and selects a user B from the list, the participation processing unit 340*a* performs participation processing with a second information processing apparatus 100*b* of the selected user. The name of the user A and the name of the user B may be undisclosed to each other at this time. A relationship between the user B who has generated a switch request and the user A (referred to as a helper) who has accepted the switch request, as described, is stored in the server 5. This allows one of the users to register the other user as a friend. It is preferred that a switch request contains play motion video that shows a game scene of interest. That way, the user can determine whether the game scene, included in the play motion video, is a game scene which the user has played in the past by watching the play motion video and comes forward as a helper when the user has an experience of playing the game scene (or when the user is confident).

An explanation is now given of multiplayer play. In multiplayer play, the user A possesses car racing game software. Before the start of the multiplayer play, the display apparatus 102*a* of the user A displays a play video image of the user B as shown in FIG. 22. In the multiplayer play, the user A also starts the car racing game software, and operation information that has been entered is exchanged between the second information processing apparatus 100*a* of the user A and the second information processing apparatus 100*b* of the user B. As described, in the multiplayer play, operation information from the user A and operation information from the user B are processed in the second information processing apparatus 100*a* and the second information processing apparatus 100*b*, respectively, and then reflected in the progress of the game in both sides. Transmission of a packet including operation information, the network account, and the session ID each by the transmission units 342*a* and 342*b* allows the respective execution units 324*a* and 324*b* to generate a game image in which operation information from both transmission units 342*a* and 342*b* are reflected.

The second information processing apparatus 100*a* according to the present exemplary embodiment provides an interface that is preferred at the time of starting multiplayer play. The second information processing apparatus 100*a* of the user A autonomously transmits a participation request to the second information processing apparatus 100*b* of the user B based on an operation input entered into the input apparatus 120 of the user A or transmits a participation request to the second information processing apparatus 100*b* in response to an invitation transmitted from the second information processing apparatus 100*b*. When the second information processing apparatus 100*b* permits the participation in response to the participation request and transmits a session ID to the second information processing apparatus 100*a*, the user A can join the multiplayer play. The user A will start the game at this time. It requires at least about several tens of seconds after starting the start-up of the game until the activation is completed so that the game can be played.

When activating game software, a start-up screen image that is set in advance in the game is usually displayed. If a game start-up screen image is displayed on the full-screen of the display apparatus 102*a* when activating the game software after receiving permission for the participation from the user B, the user A has no choice but to wait until the activation is completed. Thus, in the information processing system 1, a user interface is provided that allows the user A to spend time for the activation of the game software without feeling bored.

More specifically, when the user A instructs the activation of the game software by operating the input apparatus 120 after it is determined that the user A is joining the game, the execution unit 324*a* starts the activation of the game software. Upon the determination of the participation, the execution unit 324*a* may automatically start the activation of the game software. While the execution unit 324*a* is activating the game software, the display processing unit 326*a* continues to display the image of the game play of the user B. Processing of activating the game software is performed in the background at this time, and the start-up screen image may not be displayed. With this, the user A can wait for the activation of the game software to be completed while viewing the play video image of the user B, and a user interface that prevents the user A from getting bored can be realized. Until the activation of the game software is completed, the display processing unit 326*a* continues to display the image of the game play of the user B.

While the execution unit 324*a* is activating the game software, the display processing unit 326*a* may enlarge the display size of the image of the game play of the user B. More specifically, the display processing unit 326*a* displays a play image in a display size shown in FIG. 22 before the activation of the game software. By the time the activation of the game software is completed, the display size becomes larger covering the entire screen of the display apparatus 102*a*, and a play image of the user B is displayed in a mode such that the user A can seamlessly join the game upon the completion of the activation. When the play image is displayed on the entire area of the display, a player character of the user A may exist on the screen so that multiplayer play can start from that moment. By allowing the user A to seamlessly join the game as described above, the user A can wait until the completion of the activation of the game software without getting bored.

Time required for the activation of the game software is set in advance in the game, and the display processing unit 326*a* enlarges a play image based on the time. For example, if the set time is 30 seconds, the speed for enlarging play motion video is adjusted such that a play image is displayed on the entire area of the display 30 seconds after the start of the activation of the game software. The display processing unit 326*a* may store in advance a measured value of the activation time from the past and enlarge the play image based on the measured time.

When the user A possesses the car racing game, the user A can join in either multiplayer play or remote play. The user A may join in either mode at this time. When the user B extends an invitation, the user B may determine the participation mode.

In this regard, a high-quality image is provided in multiplayer play in comparison to remote play when focusing on the quality of an image displayed on the display apparatus 102*a* of the user A. Therefore, in a case where participation can be possible in either multiplayer play or remote play, participation may be approved only in multiplayer play. In either case, it is preferred that a participation request transmitted from the second information processing apparatus 100*a* or an invitation transmitted from the second information processing apparatus 100*b* includes information indicating a participation mode of the user A, and the user B or the user A gives consideration based on the participation mode regarding whether or not the participation is to be accepted. The user B may determine whether multiplayer play is possible based on the activity information of the user A. Alternatively, this determination may be performed by the participation processing unit 340*b*.

An explanation is given regarding a case where a participation request is transmitted from the second information processing apparatus 100*a*. In the second information processing apparatus 100*a*, the participation processing unit 340*a* knows whether or not a game in which participation is requested is installed in the second information processing apparatus 100*a*. Therefore, the participation processing unit 340*a* allows the user A to select whether to request for participation in remote play or to request for participation in multiplayer play and then requests for participation in a play mode that has been selected. Upon the receipt of this participation request, the display processing unit 326*b* in the second information processing apparatus 100*b* displays the details of the participation request on the display apparatus 102*b*, and the user B determines whether or not to permit the participation. For example, in a case where the user A requests for participation in multiplayer play and where the user B permits the participation of the user A, the both will play the game in multiplayer play. When the user B does not permit participation of the user A in multiplayer play but permits participation in remote play, the participation processing unit 340*b* creates an invitation for inviting participation in remote play, and the transmission unit 342*b* transmits the invitation to the second information processing apparatus 100*a* at this time.

An explanation is given regarding a case where an invitation is transmitted from the second information processing apparatus 100*b*. The participation processing unit 340*b* asks the second information processing apparatus 100*a* whether or not the user possesses the game. When the server 5 manages the game installed in the second information processing apparatus 100*a*, the participation processing unit 340*b* may acquire a list of games installed in the second information processing apparatus 100*a* of the user A from the server 5 or makes an inquiry as to whether the game is installed. When the participation processing unit 340*b* recognizes that the game is installed in the second information processing apparatus 100*a* by this, the participation processing unit 340*b* allows the user B to select whether to invite the user A to join in remote play or to invite the user A to join in multiplayer play and then invites the user A for a play mode that has been selected. Upon the receipt of this invitation, the display processing unit 326*a* in the second information processing apparatus 100*a* displays the details of the invitation on the display apparatus 102*a*, and the user A determines whether or not to join.

When the participation processing unit 340*b* recognizes that the game is not installed in the second information processing apparatus 100*a*, the participation processing unit 340*b* learns that the user A cannot join in multiplayer play. Therefore, the participation processing unit 340*b* checks with the user B whether to invite the user A to join in remote play.

The participation processing unit 340*b* may issue an invitation without perceiving games installed in the second information processing apparatus 100*a*. For example, when the user B invites the user A to join in multiplayer play, the participation processing unit 340*a* in the second information processing apparatus 100*a* creates a replay indicating that the user A does not possess the game when the user A does not possess the game, and the transmission unit 342*a* transmits the reply to the second information processing apparatus 100*b*. On the other hand, when the user A possesses the game, the display processing unit 326*a* displays the details of the invitation on the display apparatus 102a. As described, the participation processing unit 340a may determine whether or not the game for which an invitation has been provided is installed. Then, based on the result of the determination, the participation processing unit 340a may determine whether to display the details of the invitation or reply to the second information processing apparatus 100b indicating that the user A cannot join in a specified mode.

Explained above is an example where the user A joins in multiplayer play with the approval of the host user B. In another example, multiplayer play is suggested where the user A joins a game without obtaining the approval of the host user B. Since the host user B does not know that the user A has joined the game, the host user B persistently progresses the game as single-player play.

In the second information processing apparatus 100b, the execution unit 324b executes the game software and allows the player character to move in a game space in accordance with operation information from the user B. In the second information processing apparatus 100a, the execution unit 324a executes the same game software and allows a game character to move in the game space in accordance with operation information from the user A. The participation processing unit 340a allows the game character operated by the user A to join in the game being played on the second information processing apparatus 100b. The participation is hidden from the user B. Therefore, the game character of the user A will secretly enter the game before the user B notices while the user B is playing the game.

The user A can help or interrupt the player character of the user B. A condition for evaluating the behavior of the game character of the user A is set in advance in the game. Evaluation conditions for the game character is set for at least two indicators. A first indicator is to evaluate play that is cooperative to the player character, and a second indicator is to evaluate play that is uncooperative (interfering) to the player character. As described, the evaluation conditions are set for the behavior of the game character towards the player character in the game.

For example, defeating a predetermined number of enemies of the player character, defeating a specific enemy by the game character, and the like by the game character of the participant user A are set as evaluation conditions for the first indicator. On the other hand, hitting a predetermined number of attacks on the player character, giving damage of at least a predetermined point, preventing the player character from obtaining an item, and the like by the game character of the participant user A are set as evaluation conditions for the second indicator.

In the second information processing apparatus 100a, when the behavior of the game character of the user A satisfies the evaluation conditions that are set, the execution unit 324a provides information for identifying satisfied conditions (condition ID) to the transmission unit 342a, and the transmission unit 342a transmits the condition ID to the server 5 along with the user A's network account. Determination of whether the evaluation conditions are satisfied may be performed by the execution unit 324b in the second information processing apparatus 100b. In this case, the transmission unit 342b transmits the condition ID to the server 5 along with the user A's network account.

Figure 24:
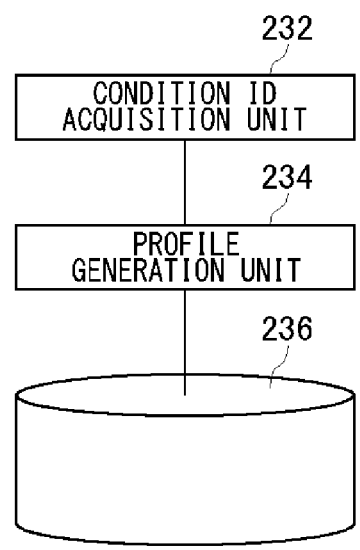
FIG. 24 is a diagram illustrating functional blocks of a server.

FIG. 24 illustrates functional blocks of the server 5. A condition ID acquisition unit 232 receives the condition ID, and a profile generation unit 234 updates profile information of the user based on the type of the condition ID that has been received. A storage unit 236 stores a table mapping the condition ID to both the type of the condition ID and a level value. The type of the condition ID specifies whether the condition ID is related to the first indicator or to the second indicator. The level value is an increase in a level for playing. For example, if a condition ID received from a second information processing apparatus 100 is related to the first indicator, the profile generation unit 234 increases the accumulated level of the first indicator by the amount of the level value for the condition ID. As described, the profile generation unit 234 increases the level value of the first or second indicator based on the condition ID that has been received, updates the profile information, and stores the increased level value and the updated profile information in the storage unit 236.

The profile generation unit 234 may determine the level value in consideration of the degree of proficiency in the game of the user B who has been joined. For example, the degree of proficiency is determined in accordance with a state of acquisition of a trophy or the like. There are various types of users who have been joined without the users' awareness; for example, there are those who are extremely proficient in the game, and there are those who seldom play the game. If the user B is a highly-proficient player, an enemy character that is operated by the user A and that has an unusual movement allows the user B to play the game without getting bored, and the user B can thus have a new experience. On the other hand, if the user B is a beginner, the user A who is participating will play to support the player character of the user B. The profile generation unit 234 may determine the amount of an increase in the level of the user A based on the degree of proficiency (competence) of the user B. For example, the profile generation unit 234 may directly apply a level value that is set in the table for the user A's play when the degree of proficiency of the user B is high. The profile generation unit 234 may use a value obtained by multiplying, by a number less than one, the level value that is set when the degree of proficiency is low so as to update the profile information.

Figure 25:
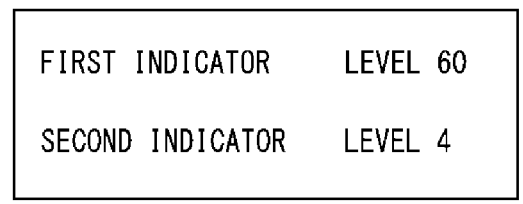
FIG. 25 is an example of profile information generated by the profile generation unit 234.

FIG. 25 is an example of profile information generated by the profile generation unit 234. The profile generation unit 234 sets a level value that corresponds to each indicator. According to the profile information, it is found that the user A has a strong tendency to play cooperatively. Therefore, it is possible for the server 5 to provide a way to have fun that suits the user A's preference using this profile information such as recommending a game that the user A would likely prefer and recommending multiplayer play with a user who has a similar tendency in play.

Described above is an explanation of the present invention based on the embodiments. These embodiments are intended to be illustrative only, and it will be obvious to those skilled in the art that various modifications to constituting elements and processes could be developed and that such modifications are also within the scope of the present invention.

In the exemplary embodiment, an explanation is given of the link button 174 for acquiring acquisition page configuration data from the server 5. The exemplary embodiment shows that the link button 174 is displayed in a first information processing apparatus 10. Alternatively, the link button 174 may be displayed in association with play motion video or a live video image in a second information processing apparatus 100.

When displaying another user's live video image or play motion video, the link button 174 may be displayed in association with the motion video and may be displayed at all time regardless of an operation from the user. In addition to being displayed as a link to acquisition page configuration data, the link button 174 may be displayed as a various kinds of button depending on the motion video.

In the second information processing apparatus 100, the display processing unit 326 checks a relationship between play motion video (live video image) being displayed and the game of the motion video. For example, if the play motion video is a video image of the game Y, the display processing unit 326 determines, in reference to a list of games that have been downloaded or installed in the second information processing apparatus 100, whether the game Y is included in the list of the downloaded games. If the game Y is not downloaded at this time, a link button 174 for making a purchase is displayed in connection with the play motion video of the game Y.

On the other hand, if the game Y has been downloaded but has not been installed, the display processing unit 326 displays a button for allowing the installation in association with the play motion video. With this, the user learns that the game Y has not been installed yet and recognizes that the game Y can be installed and played by pressing the installation button. If the game Y has already been installed, the display processing unit 326 displays a button for allowing the user to play or a button for creating a schedule for playing against a friend in association with the play motion video. Pressing the play button will start the game Y, and pressing the schedule button will allow a schedule to be created for a match against a friend. As described, based on the state of the game being displayed in the play motion video in the second information processing apparatus 100, in other words, based on a state of whether or not the game has already been downloaded and whether or not the game has been already installed, the display processing unit 326 displays a button for prompting the user for a next action in association with the play motion video.

In the exemplary embodiments, a storage area for save data in the second information processing apparatus 100 is shown to be created in the memory unit 330. Alternatively, the save data may be stored in the server 5 while being linked to the network account of the user. The save data stored in the server 5 allows the user to access the save data from both the first information processing apparatus 10 and the second information processing apparatus 100. Even in the case of game play in a friend's house, the user can use the save data stored in the server 5 by signing in using the network account.

When starting the second information processing apparatus 100 for the first time, the user registers setting information such as the display format of a display, sound output, and the like in the second information processing apparatus 100. This setting information may also be registered in the server 5. With this, in the case, e.g., where the user purchases a new second information processing apparatus 100, labor of manual input can be saved by allowing the setting information to be read from the server 5 by the second information processing apparatus 100.

The exemplary embodiments show that a user can join a game in a remote play or multiplayer mode. In a second information processing apparatus 100, a participation processing unit 340 may have a function of finding who is playing what games on the network and allowing the result thereof to be browsed. The participation processing unit 340 may search for a game session that is of a game installed in the second information processing apparatus 100 and that is being run in a mode where the user can join on the network and may display information specifying the game session that has been detected. This allows the user to be able to play the game together with another user who is not registered as a friend.

Also, it is explained in the exemplary embodiments that when the server 5 divides game software into a first file and a second file and transmits the files, the installation processing unit 322 is capable of performing a process of installing the second file during the execution of the game software for the first file. This is not limited to this case. For example, it is preferred that the installation processing unit 322 install download content in the memory unit 330 during the execution of game software by the execution unit 324 and that, after the installation, the execution unit 324 be able to use the installed content without ending the game software being executed.

Also, it is explained in the exemplary embodiments that the user is able to play a game by selecting a predetermined item on a menu screen image. In the second information processing apparatus 100, a user interface (UI) for starting a game may be prepared separately so that the user can start the game through the UI.

Figure 26:
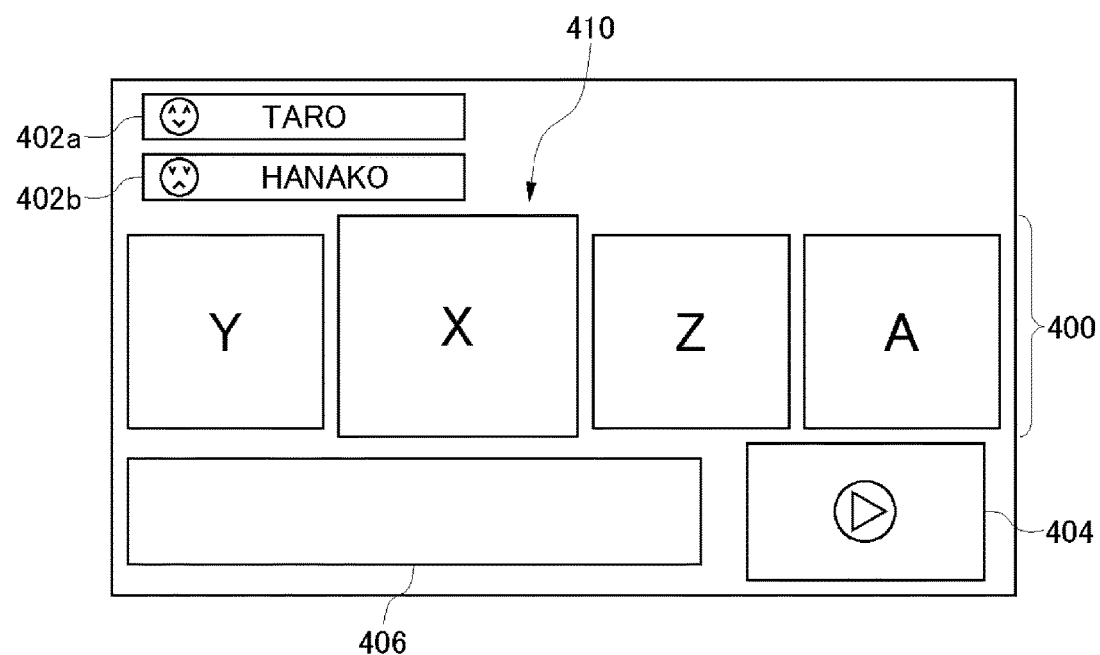
FIG. 26 is a diagram illustrating an example of a UI for starting a game.

FIG. 26 illustrates an example of a UI for starting a game. The display processing unit 326 displays the UI for starting a game on the display apparatus 102. On the UI for starting a game, a title display area 400 is provided where game icons are arranged in a line. Using the input apparatus 120, the user can move the game icons arranged in a line to the left or to the right. In the title display area 400, game icons of a maximum of a predetermined number (e.g., four) are arranged, and the area displaying the second icon from the left of these icons is set to be a focus area 410. In the figure, four icons for a game Y, a game X, a game Z, and a game A are arranged from the left, and an icon for the game X is located in the focus area 410. If the user presses a predetermined determination button of the input apparatus 120 in this state, the game X is started.

The acquisition unit 300 acquires predetermined information from the server 5 in regard to the game title located at the focus area 410. The acquisition unit 300 acquires information identifying friends who are playing the game X and image data of game play of one of the friends. The display processing unit 326 displays the information identifying the friends who are playing the game X in friend display areas 402a and 402b and displays a game video image of play being performed by one of the friends in a play image display area 404. The display processing unit 326 may display past Play history of the user in a game start-up history display area 406.

As described, on the UI for starting a game, the display processing unit 326 presents various types of information to the user in regard to a game for an icon located in the focus area 410. The type of information to be displayed by the display processing unit 326 may be set for each game. More specifically, a file specifying the layout of a display area other than the title display area 400 and a file for display including a resource file, and the like, that defines display objects are prepared for each game. With reference to the file for display, the display processing unit 326 arranges display objects customized for each game in the display area other than the title display area 400.

By moving a game icon to the focus area 410, the user can easily learn information on a corresponding game. The UI for starting a game shown in FIG. 26 is an example. For example, the title display area 400 may be displayed in the vertical direction on the screen so that game icons are scrolled in the vertical direction.

Game icons displayed in the title display area 400 are not limited to those for games that are already installed. The game icons may be, for example, those for games that are not yet downloaded. Even when a game is not downloaded, the user can download a file for display of the game. Thus, the display processing unit 326 can arrange respective icon images of games that are not yet downloaded in the title display area 400. For example, the display processing unit 326 may display respective link buttons to purchase screen images of games in accordance with respective files for display. The display processing unit 326 may also display respective motion videos introducing the games. As for the files for display, both files for display used for games that are already installed and files for display used for games yet to be installed may be prepared. The display processing unit 326 has a function of determining whether or not a game is already installed. If a game arranged in the focus area 410 is already installed, the display processing unit 326 arranges a display object in reference to a file for display used when the game is already installed. On the other hand, if a game arranged in the focus area 410 is not yet installed, the display processing unit 326 arranges a display object in reference to a file for display used when the game is not yet installed.

DESCRIPTION OF THE REFERENCE NUMERALS

1 information processing system, 10 first information processing apparatus, 100, 100*a*, 100*b* second information processing apparatus, 102, 102*a*, 102*b* display apparatus, 120 input apparatus, 174 link button, 176 purchase button, 200 acquisition unit, 202 display processing unit, 204 reception unit, 206 request generation unit, 208 transmission unit, 220 request reception unit, 222 transmission processing unit, 224 content search unit, 230 retention unit, 232 condition ID acquisition unit, 234 profile generation unit, 236 storage unit, 300 acquisition unit, 302 instruction acquisition unit, 304 content acquisition unit, 306 image data acquisition unit, 308 operation information acquisition unit, 310 activation control unit, 312 input unit, 320 processing unit, 322 installation processing unit, 324 execution unit, 326 display processing unit, 330 memory unit, 332 icon image, 334 restriction mark, 340 participation processing unit, 342 transmission unit, 344 image data generation unit, 350*a*, 350*b* game image

INDUSTRIAL APPLICABILITY

The present invention can be applied to a technical field of information processing.

The invention claimed is:

1. A first information processing apparatus of a first user comprising:
    an acquisition unit configured to acquire, over a network, image data in which game play of a game is recorded or image data of the game play of the game currently being played by a second user of a further client information processing apparatus, and to acquire information over the network from the further client information processing apparatus for identifying software of the game;
    a display processing unit configured to display an image of the game play using the acquired image data and to display an image for acquiring the software of the game while the image of the game play is being displayed or after completion of the display of the image of the game play;
    a reception unit configured to receive an input operation from the first user in the image for acquiring the software of the game;
    a request generation unit configured to generate, based on the received operation from the first user and using the acquired information for identifying the software of the game, a request for accessing a screen image for acquiring the software of the game; and
    a transmission unit configured to transmit the generated request for accessing the screen image from the first client information processing apparatus to a network server,
    wherein the request is used for facilitating a download of the software of the game from the network server to a destination, where the destination is a second client information processing apparatus of the first user.

2. The first client information processing apparatus according to claim 1, wherein the first client information processing apparatus of the first user receives the screen image from the network server over the network, and the screen image includes at least one selectable icon for receiving a download instruction from the first user, where the download instruction indicates the first user's desire to download the software of the game from the network server.

3. The first client information processing apparatus according to claim 2, wherein:
    the request generation unit generates the request for downloading that indicates, as the destination the second client information processing apparatus of the first user; and
    the second client information processing apparatus of the first user issues a further request to initiate the download of the software of the game over the network.

4. An information processing system provided with a first client information processing apparatus of a first user, a second client information processing apparatus of the first user, and a server,
    wherein the first client information processing apparatus comprises:
    a first acquisition unit configured to acquire, over a network, image data in which game play of a game is recorded or image data of the game play of the game currently being played by a second user of a further client information processing apparatus, and to acquire information over the network from the further client information processing apparatus for identifying software of the game;
    a display processing unit configured to display an image of the game play using the acquired image data and to display an image for acquiring the software of the game while the image of the game play is being displayed or after completion of the display of the image of the game play;
    a first reception unit configured to receive an input operation from the first user in the image for acquiring the software of the game;
    a request generation unit configured to generate, based on the received operation from the first user and using the acquired information for identifying the software of the game, a request for accessing a screen image for acquiring the software of the game; and
    a transmission unit configured to transmit the generated request for accessing the screen image from the first client information processing apparatus to the server,
    wherein the server comprises:

a transmission processing unit configured to transmit data for generating the screen image for acquiring the software of the game, and wherein the request is used for facilitating a download of the software of the game from the server to the second client information processing apparatus of the first user.

5. The information processing system according to claim 4, wherein, the first client information processing apparatus of the first user receives the screen image from the server over the network, and the screen image includes at least one selectable icon for receiving a download instruction from the first user, where the download instruction indicates the first user's desire to download the software of the game from the network server, the server comprises a second reception unit configured to receive the request for downloading, and the transmission processing unit transmits, to the second client information processing apparatus, the software of the game identified by the request for downloading, and the second client information processing apparatus comprises a second acquisition unit configured to download the software of the game from the server.

6. The information processing system according to claim 5, wherein the request generation unit generates the request for downloading that indicates that the second client information processing apparatus is the destination of the software of the game, and the second client information processing apparatus issues a further request to initiate the download of the software of the game over the network.

7. A non-transitory computer-readable recording medium containing a computer program, which when executed by a computer, causes the computer to implement elements of a first client information processing apparatus of a first user, comprising:

an acquisition unit configured to acquire, over a network, image data in which game play of a game is recorded or image data of the game play of the game currently being played by a second user of a further client information processing apparatus, and to acquire information over the network from the further client information processing apparatus for identifying software of the game;

a display processing unit configured to display an image of the game play using the acquired image data and to display an image for acquiring the software of the game while the image of the game play is being displayed or after completion of the display of the image of the game play;

a reception unit configured to receive an input operation from the first user in the image for acquiring the software of the game;

a request generation unit configured to generate, based on the received operation from the first user and using the acquired information for identifying the software of the game, a request for accessing a screen image for acquiring the software of the game; and a transmission unit configured to transmit the generated request for accessing the screen image from the first client information processing apparatus to a network server, wherein the request is used for facilitating a download of the software of the game from the network server to a destination, where the destination is a second client information processing apparatus of the first user.

* * * * *